US012558692B2

(12) United States Patent
Nordell

(10) Patent No.: US 12,558,692 B2
(45) Date of Patent: Feb. 24, 2026

(54) SYSTEM AND METHOD FOR COMMINUTING MATERIALS

(71) Applicant: CANADA MINING INNOVATION COUNCIL, Ottawa (CA)

(72) Inventor: Lawrence K. Nordell, Monroe, WA (US)

(73) Assignee: CANADA MINING INNOVATION COUNCIL, Ottawa (CA)

( * ) Notice: Subject to any disclaimer, the term of this patent is extended or adjusted under 35 U.S.C. 154(b) by 292 days.

(21) Appl. No.: 18/017,561

(22) PCT Filed: Jul. 22, 2021

(86) PCT No.: PCT/CA2021/051025

§ 371 (c)(1),
(2) Date: Jan. 23, 2023

(87) PCT Pub. No.: WO2022/016286

PCT Pub. Date: Jan. 27, 2022

(65) Prior Publication Data

US 2023/0302459 A1 Sep. 28, 2023

Related U.S. Application Data

(60) Provisional application No. 63/055,247, filed on Jul. 22, 2020.

(51) Int. Cl.

*B02C 13/28* (2006.01)
*B02C 13/282* (2006.01)
*B02C 13/286* (2006.01)
*B02C 15/00* (2006.01)
*B02C 15/06* (2006.01)

(52) U.S. Cl.

CPC ............ *B02C 13/28* (2013.01); *B02C 13/282* (2013.01); *B02C 13/286* (2013.01); *B02C 15/003* (2013.01); *B02C 15/06* (2013.01); *B02C 2013/28654* (2013.01)

(58) Field of Classification Search

CPC ....... B02C 15/003; B02C 15/06; B02C 13/28; B02C 13/282

See application file for complete search history.

(56) References Cited

U.S. PATENT DOCUMENTS 8,955,778 B2 * 2/2015 Nordell .................. B02C 15/06 241/228
2014/0209717 A1 * 7/2014 Barthelmess ......... B02C 13/284 241/24.1
2020/0070175 A1 * 3/2020 Nordell .................. B02C 17/20

* cited by examiner

*Primary Examiner* — Mohammed S. Alawadi
(74) *Attorney, Agent, or Firm* — Lavery, de Billy, L.L.P.

(57) ABSTRACT

There is provided an apparatus and method for comminuting a material. The apparatus may comprise a chamber and an inner surface with a plurality of protrusions, and a hammer positioned within said chamber comprising an outer surface having a plurality of second protrusions configured to engage with the first protrusions. The outer and inner surfaces may be separated by a gap distance which defines a comminution zone. The anvil may be rotated to cause a material to be comminuted as the material passes through the comminution zone.

25 Claims, 14 Drawing Sheets

SYSTEM AND METHOD FOR COMMINUTING MATERIALS

CROSS-REFERENCE TO RELATED APPLICATIONS

This claims priority to U.S. Provisional Patent Application No. 63/055,247, filed on Jul. 22, 2020, the entire contents of which are incorporated by reference.

FIELD

This disclosure relates to rock (material) grinding mills and more particularly to a roller hammer grinding mill having a single rolling hammer therein.

BACKGROUND

For many industrial purposes it is necessary to reduce the size of rather large rocks or other material to a smaller particle size (commonly called "comminution"). For example, the larger rocks may be blasted out of an area such as a hillside, pit or mine, and these larger rocks are then directed into a large rock crusher, which is typically the first stage of comminution after blasting. The blasted rock sizes can exceed 1000 mm (>40 inches) in size. The resulting output of the crusher is typically smaller rock that is less than 200 mm (8 inches) in a longest dimension which is then fed to a grinding mill or similar device. In one example such a grinding mill comminutes the crushed rock down to 50 mm (2 inches) sized rocks or less, often down to less than one mm in diameter.

One prior art grinding mill comprises a large cylindrical grinding section, rotating along its horizontal axis, which in one example has a diameter of ten to fifty feet. One such mill is described in U.S. Pat. No. 7,497,395 incorporated herein by reference. The material (rocks or other material), along with optionally water or air, are directed into one end of the continuously rotating grinding section, which in one example comprises various types of lifting ribs (lifters) positioned axially on the inside surface of the grinding section to carry the material upwardly, on its surface, in a curved upwardly directed path within the grinding chamber so that this partially ground material tumble back onto other material in the lower part of the chamber. Thus, this material impacts other material components, and the inner surface of the grinding mill, optional bars, optional balls, etc., and the material is broken up into smaller fragments.

A tremendous amount of power is required to operate many examples of these grinding mills, in addition there are other substantial costs involved in maintenance, operation, and repair. There are several factors which relate to the effectiveness and the economy of the operation, and the embodiments of the disclosure are directed toward improvements in such grinding mills and the methods employed.

SUMMARY

Disclosed herein are several embodiments of a monoroll grinding mill (MRGM). In some embodiments, the MRGM comprises an outer (anvil) ring, tube, or shell with a single large roll or hammer therein. The outer ring or anvil in one example has a substantially cylindrical structure with a substantially cylindrical inner surface. The inner surface of the anvil may have a substantially circular shape in cross section and may comprise a textured or fluted surface. The texture and shape of the inner surface may change along the length of the shell. These surfaces may cooperate with surfaces on the hammer to rotate the hammer, align the hammer and the anvil, crush material, and direct material from a feed end of the mill 20 to a discharge end. The anvil in one example is supported on bearing pads or rollers beneath the anvil. These bearing pads support the anvil and allow the anvil to rotate about its long (horizontal) axis. The anvil rotates about the horizontal axis in use as material therein is comminuted. The anvil defines a substantially cylindrical chamber where material is placed during comminution. The MRGM in one form has a rolling hammer located within the anvil, the rolling hammer in one example comprising a substantially cylindrical structure forming a substantially cylindrical outer surface. The anvil may have at least one opening to allow sized (crushed) rock to exit the MRGM during rotation of the hammer and the anvil.

The centers or axes of the anvil and hammer are vertically offset, resulting in their rotation causing a closing action of their surface distances to a minimum gap therebetween. In this minimum gap the highest compression stress is applied to the material being comminuted. The gap between the anvil inner surface and the hammer outer surface create compression of the material therebetween during the concurrent rotating motion of the hammer and the anvil, forcing the material into a smaller and smaller available gap. The hammer compresses and comminutes the material against the anvil, resulting in compression and shear fracture of the material therebetween.

In some embodiments, the anvil and hammer each have surface protrusions, ridges, or other textures of variable size, height and/or angular orientation, such that rock or other materials may be captured between protrusions and then crushed between the anvil and hammer as they rotate. These surface protrusions may also cooperate to transfer rotational torque from the anvil to the hammer to rotate the hammer within the anvil. These surface protrusions in one example are helically oriented down the axis of the hammer/anvil they extend from, to direct the material being comminuted longitudinally down the MRGM or to control the relative axial thrust between the anvil and the hammer. In some embodiments, the hammer has one or more ridges that engage cooperating groove(s) of the anvil such that material is crushed between the anvil and the hammer, due to offset radial centers of the anvil and hammer. In this way, the anvil and hammer may operate at differential rotational speeds with respect to each other to induce shear forces, as well as compression forces on the material to be comminuted.

DETAILED DESCRIPTION

Figure 2:
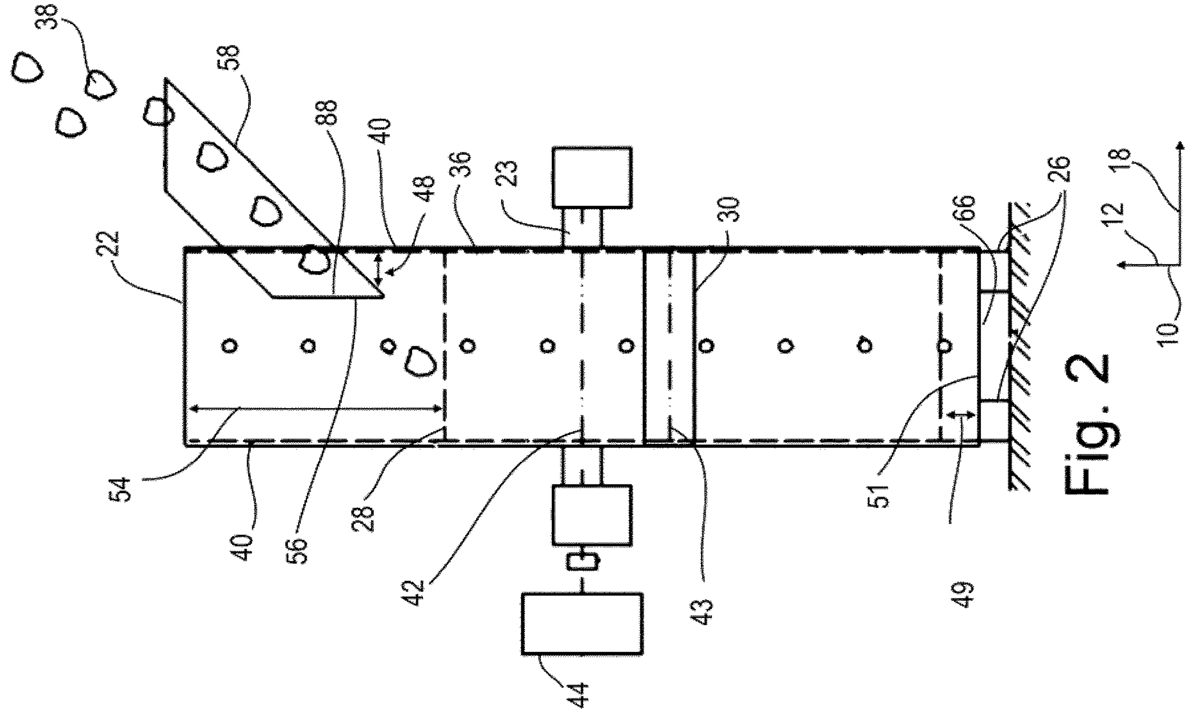
FIG. 2 is a hidden line side view of the example shown in FIG. 1

In this disclosure, various aspects of a monoroll grinding mill (MRGM) 20 will be described. Specific details will be set forth in order to provide a thorough understanding of the disclosure. In the specification and drawings, well-known features may be omitted or simplified in order not to obscure the disclosed features. Repeated usage of the phrase "in one embodiment" or "in one example" does not necessarily refer to the same embodiment or example.

For ease in description, an axes system 10 is shown which generally comprises a vertical axis 12, an anvil radial axis 14 extending radially outward from the center of the anvil (outer) ring 22, a hammer radial axis 16 extending radially outward from the center of the hammer (inner) ring 28, and a longitudinal axis 18. Each of the hammer and the anvil may be right cylinders, oblique cylinders, or combinations thereof with other geometric shapes. The longitudinal axis 18 is substantially parallel to the axes 42 of rotation of the shell 22, and the axes 43 of rotation of the hammer 28. These axes and directions are included to ease in description of the disclosure and are not intended to limit the disclosure to any orientation.

The term "material" is used herein to indicate rock, ore, mineral matter of variable composition, and equivalents. These may be consolidated or unconsolidated, assembled in masses or considerable quantities, as by the action of heat or water and equivalent materials. The material (for example rock) may be unconsolidated, such as a sand, clay, or mud, or consolidated, such as granite, limestone, or coal. While not normally defined as rock, equivalent materials such as hardened concrete may also be used in the disclosed mill and are included in the term "material".

Figure 1:
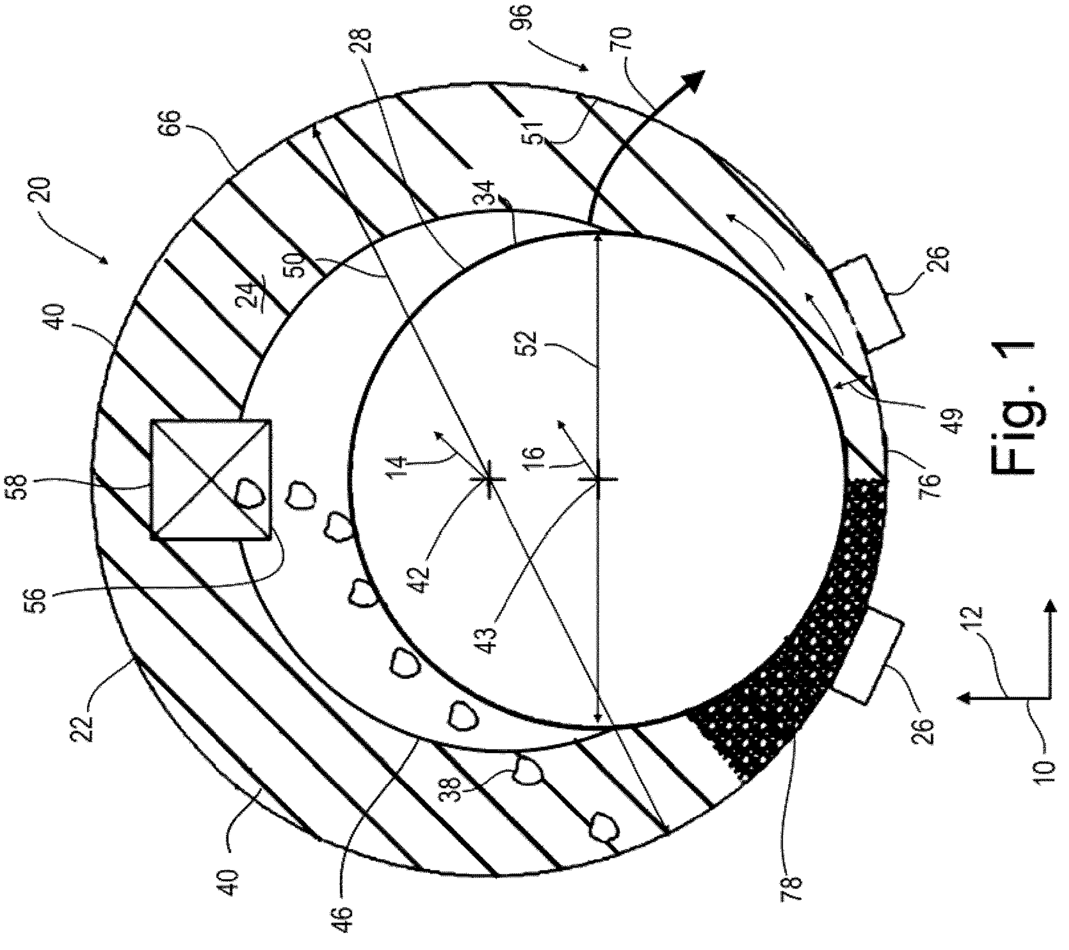
FIG. 1 is a highly schematic cross-sectional, end view, of one example of the disclosed MRGM.

FIG. 1 is a simplified schematic cross-sectional end view of one example of MRGM 20. This embodiment of the MRGM comprises the outer anvil 22 having a substantially cylindrical inner surface which defines a chamber 24. The anvil 22 is supported in one form by bearing pads 26. Bearing pads 26 may include bearings, lubricants, drive gears, drive belts, wheels, and/or friction resisting materials.

In some embodiments, hammer 28 may be provided with an external pressure device configured to press the hammer 28 against the inner surface of the anvil 22. One such external pressure system is disclosed in U.S. Pat. No. 8,955,778 filed on Mar. 15, 2012 incorporated herein by reference. In some embodiments, hammer 28 might not be provided with an external pressure device configured to press hammer 28 against the inner surface of anvil 22.

The anvil 22 in one example rotates about the anvil longitudinal axis 42. The hammer 28 in one form comprising a substantially cylindrical outer surface 34 rolls within the anvil 22 and presses down upon the material to be comminuted and may comprise ridges configured to longitudinally move material during rotation. In one example, the hammer 28 is mounted to a shaft 30 to rotate about a longitudinal axis 43 substantially parallel to and offset from the axis 42 of the anvil 22. The outer surface 34 of the hammer 28 and/or inner surface 51 of the anvil 22 may, in some embodiments, have a plurality of protruding elements or ridges such as the protruding elements 32 (as depicted, for example, in FIG. 32) extending radially 16 from the outer surface 34 of the hammer 28, wherein the protruding elements 32 in this form may increase efficiency of comminution as the hammer 28 and anvil 22 rotate. In some embodiments, protruding elements 32 may be machined directly on inner surface 51. In some embodiments, protruding elements 32 may be incorporated into a system of removable and/or replaceable liner plates for inner surface 51, as described herein.

Figure 49A:
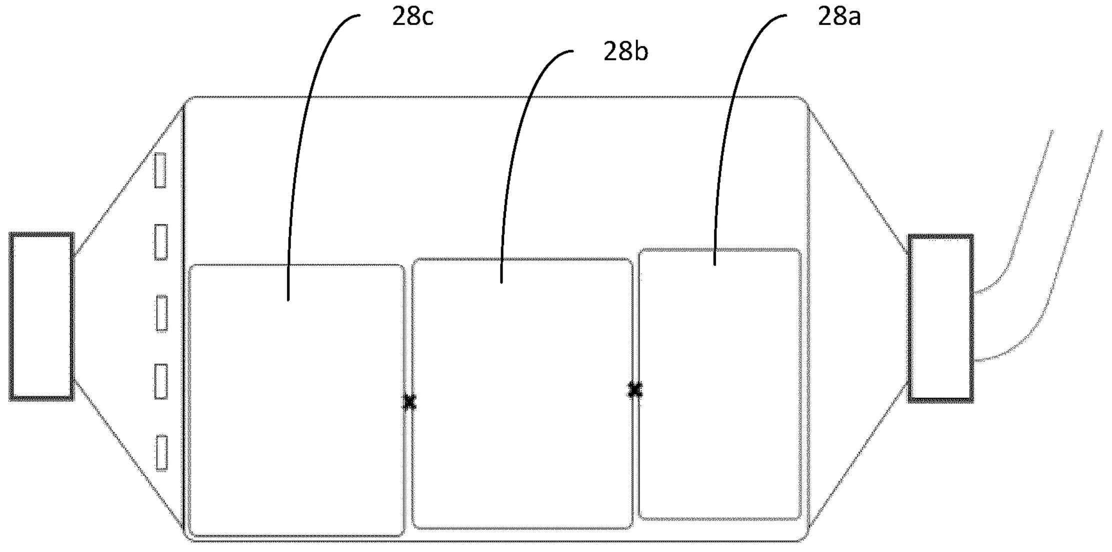
FIG. 49A is an illustration of an example embodiment of a hammer having multiple axial sections.
Figure 49B:
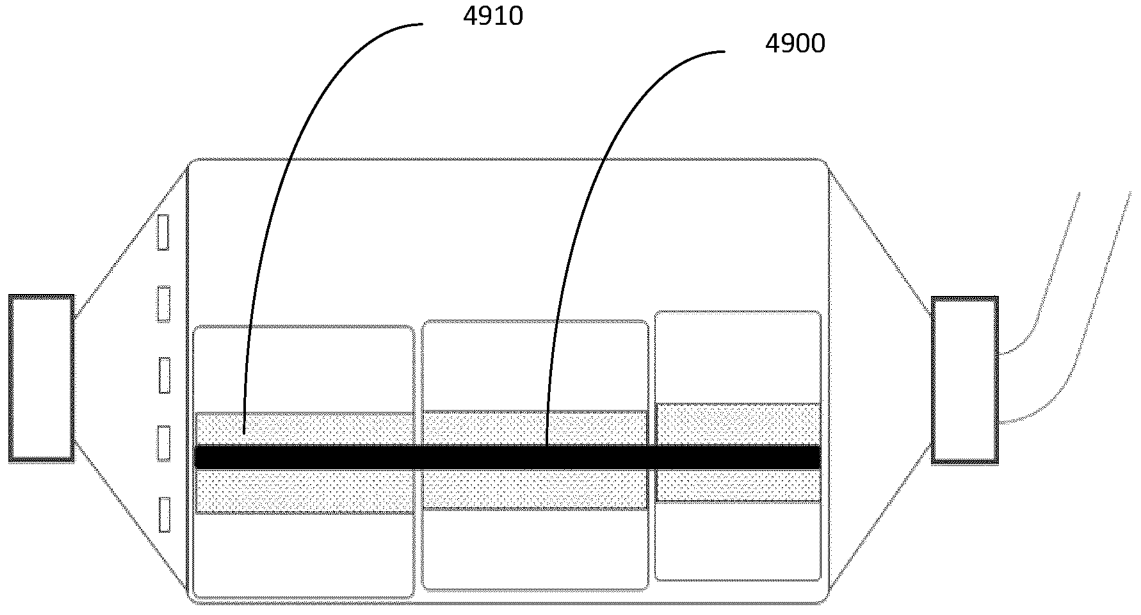
FIG. 49B is an illustration of an example embodiment of a hammer having multiple axial sections connected by a common shaft.

During the process of comminuting, material 38 is inserted into the chamber 24 and comminuted between the outer surface 34 of the hammer 28 and the inner surface 51 of the anvil 22. A fluid (for example, air, water, or the like) may also be added to aid in transport (e.g. by differential transport based on size) of the material 38 longitudinally 18 down the anvil 22 and aid in comminution. In some embodiments, retaining shields 40 are positioned at the anvil outer edges to contain material before and during comminution and to allow exiting of material when the material is adequately comminuted. In some embodiments, retaining shields may be conical in shape, as depicted in FIGS. 49A and 49B.

As depicted, in some embodiments there may be a longitudinal gap 36 between the inner end surface of the anvil 22 or retaining shield 40 and the end of the hammer 28. Thus, the feeding point 56 of the chute 58 may be longitudinally 18 inward from the shield 40 to form an overlap distance 48 such that material 38 inserted is less likely to be deposited in the gap 36. Alternatively, in some embodiments, retaining shield 40 may be fitted with one or more liners which include ridges and/or flutes configured to transport and/or cascade the feed material into comminution zones.

In some embodiments, one or more of the density, size, shape, and mass of the hammer 28 may be specifically configured to maximize comminution based on the anvil 22 configuration, and material 38 to be comminuted. The mass and density of the hammer 28 may be changed by providing a void or voids within the hammer 28. These voids may contain other materials such as water or other liquids, lead shot, sand, balls or other solids.

In FIGS. 1 and 2, an example of the hammer 28 is shown positioned inside the anvil 22, wherein the rotational axes 43/42 of each are shown respectively. In this example, the anvil 22 may be rotated, power for rotation provided by a motor 44. To vertically support and maintain position, the anvil 22 may rest on external bearing pads 26.

In one example, the anvil 22 may be supported by bearing pads 26 or wheels/tires. In some embodiments, bearing pads 26 may be hydrodynamic. Bearing pads 26 may be configured to exert lifting/supporting/rotational force on the outer surface 66 of the anvil 22. An example is shown in FIG. 2 where the motor 44 drives the axle or shaft 23 of the anvil 22. This motor 44 may also drive the shell of the anvil 22 rather than a central shaft. In one example as shown, the outer surface 34 of the hammer 28 rolls within the inner surface 51 of the anvil 22. In some examples, the outer surface 34 of the hammer 28 is configured via flutes or similar protrusions to cooperate with flutes or similar structures to transmit rotational force to the hammer 28.

In another example, a motor may alternatively or cooperatively drive (rotate) the hammer 28 by way of a gearing system, or other apparatus such as a belt, or chain drive.

In some embodiments, the hammer 28 may be pressed against the anvil 22 by additional force, such as by inserting fluids (e.g. water) or other solids (e.g. metals) into the hollow hammer 28.

Some embodiments may reduce the circumference of the hammer 28, which may increase compression in the fracture zone 78 where a larger circumference would more evenly distribute this pressure. By utilizing the weight of the hammer 28 to comminute material 38 with no external pressure/drive system, power consumption directed toward forcing the hammer 28 against the anvil 22 can be decreased relative to prior art embodiments. This configuration in one example operates as a constant-pressure system, rather than constant pressure system known with a hydraulic or other compression system. In this configuration, when material 38 is not comminuted due to hardness, volume, size, or a combination thereof, the gap 49 between the outer surface 34 of the hammer 28 and the inner surface 51 of the anvil 22 will increase, rather than jamming or damaging the MRGM 20 as is common in constant gap systems. Where the hammer 28 is allowed to float on the material 38 above the inner surface 51 of the anvil 22 in a constant pressure system increases efficiency of the apparatus in many applications.

In some embodiments, the hammer 28 has an outer diameter 52 sized between 40% and 80% of the inner diameter 50 of the anvil 22. In one example the hammer 28 has an outer diameter 52 0.2 (20%) of the inner diameter 50 of the anvil 22. In another example, the ratio between outer diameter 52 of hammer 28 and inner diameter 50 of the anvil 22 is between 0.65 and 0.7. This ratio represents a trade-off between (a) a larger hammer 28 to improve the mechanical crushing advantage and longer wear life of the anvil 22 to comminute material, and (b) a smaller anvil 22 which can be configured to comminute lighter throughput and be able to crush larger material due to the clearance 54 at the feeding point 56 as shown in the top of FIG. 2.

In one example, the diameter 52 of the hammer 28 is no less than 0.2 of the inner diameter 50 of the anvil 22, which may ensure or increase the likelihood that that pressure between the hammer 28 and the anvil 22 are adequate for breakage (comminution) of the material.

Figure 50:
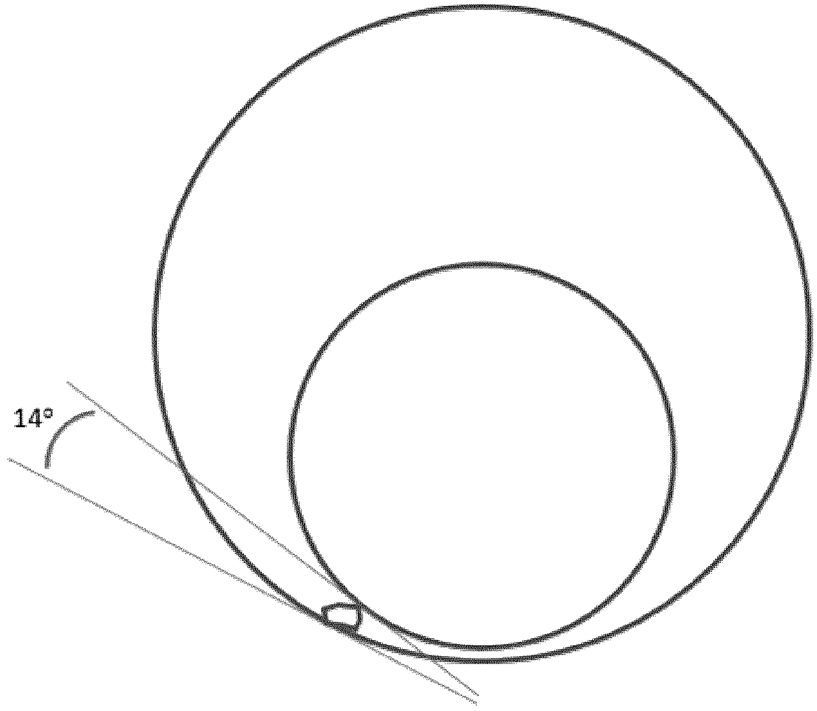
FIG. 50 is an illustration of an angle between the hammer and the anvil which is 14 degrees or less.

In some embodiments, the relative size of the hammer and anvil roll may be selected to provide an angle between the hammer and anvil which is 14 degrees or less (as depicted, for example, in FIG. 50). In some embodiments, an angle of 14 degrees or less may ensure that larger particles become trapped between hammer 28 and the shell as they rotate together and close the gap as described herein. At angles larger than 14 degrees, there is a risk that larger particles may be pushed back out, or fail to engage with the rotation of the hammer and anvil. In some embodiments, when the angle is 14 degrees or less, particles may become "locked" or otherwise secured into the rolling action and be carried beneath the hammer 28 to be broken. In contrast to existing devices where the breaking action between particles and grinding media is random or intermittent, the above-noted locking between the hammer and the anvil as they rotate together may lead to one or more ensured breakage events each time a rock is returned to the chamber and presented to the roll.

Figure 11:
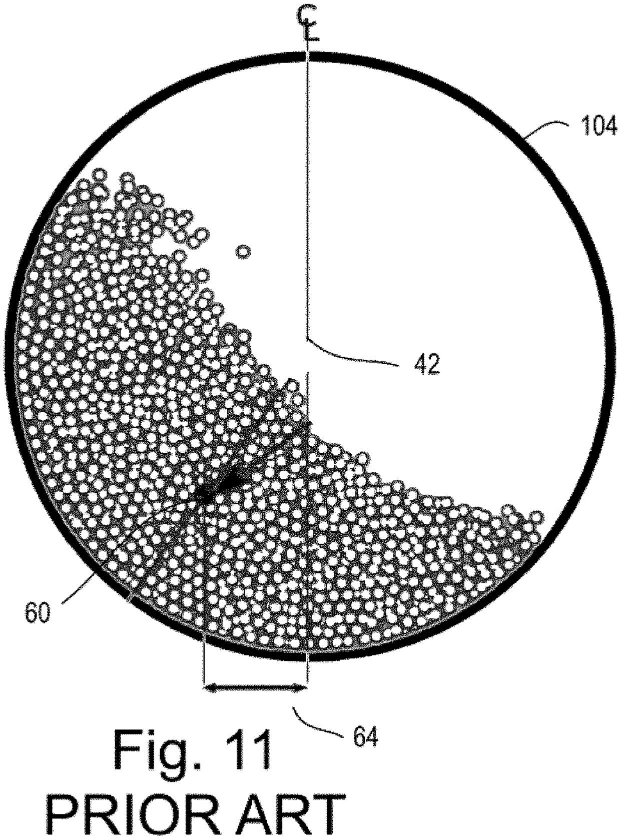
Fig. 11 PRIOR ART
FIG. 11 is a highly schematic end view of a prior art ball mill.
Figure 12:
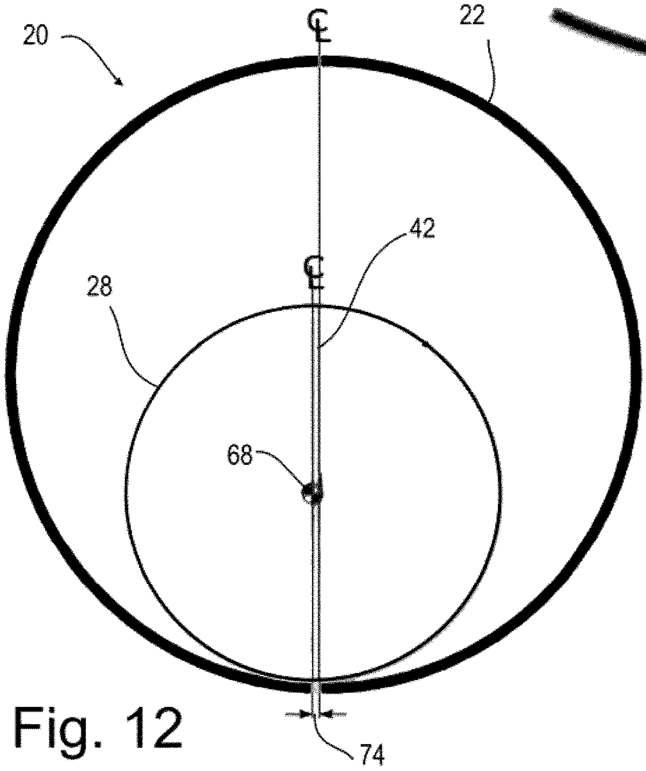
FIG. 12 is a highly schematic end view of an MRGM.

As depicted in FIG. 11, the center of mass 60 is seen offset from the center 42 of the anvil 22 by a lateral distance 64 or moment. This offset creating torque on the system, and greatly reducing efficiency of the overall system. FIG. 12 depicts the center of mass 68 of a MRGM where the distance 74 or moment is significantly reduced compared to the mill depicted in FIG. 11. The smaller moment may improve the energy efficiency of the MRGM.

This torque and associated inefficiency can be further reduced where the center 43 of the hammer 28 is laterally much closer to the longitudinal center 42 of the anvil 22 and the rotational speed of the anvil 22 is set such that the material 38 might not build up at any one longitudinal location. In such an arrangement, the speed of the anvil 22 in cooperation with the depth of the protruding elements 33 on the anvil 22, size/mass/density of the material 38, inner diameter 50 of the anvil 22 may be coordinated such that the material 38 is centrifugally forced radially toward the anvil 22 and in each rotation of the anvil 22, the material 38 circles the hammer 28 and is once again presented to be broken as the hammer 28 and anvil 22 rotate together. In some embodiments, selection of appropriate anvil 22 speed, protruding elements 33, size/mass/density of material 38, and inner diameter 50 may ensure that with each rotation of anvil 22, material 38 is returned back over the roll to the "feed side", and will therefore experience repeated breakage events as the anvil 22 rotates. This may represent a significant advantage over other known systems, which may only produce one breakage event (rather than repeated breakage events for material 38, which may cause increased fragmentation and reduction in particle size with each subsequent breakage event).

Figure 18:
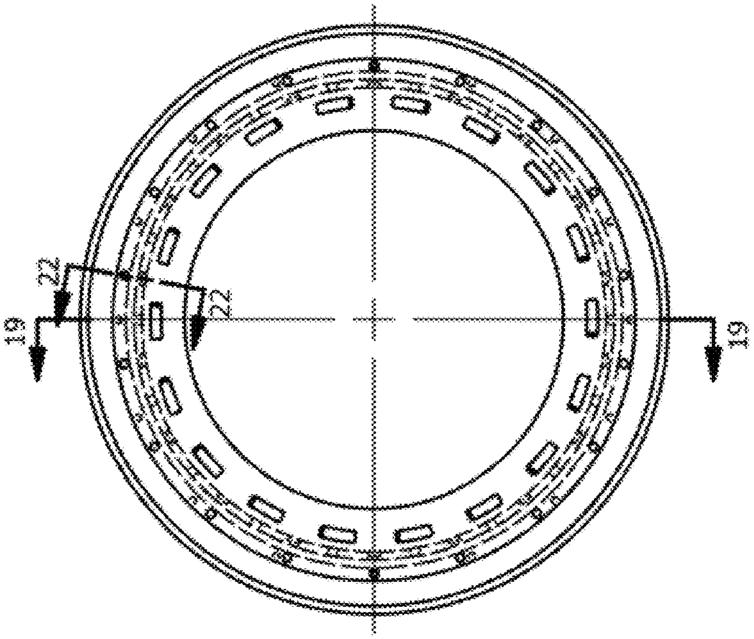
FIG. 18 is an end view of one example of the anvil component disclosed herein.
Figure 20:
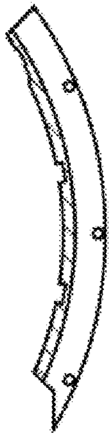
FIG. 20 is a detail enlarged view of the region 20-20 shown in FIG. 19.
Figure 31:
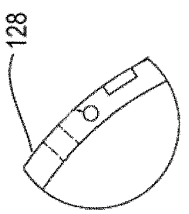
FIG. 31 is an enlarged view of a region 31 of FIG. 24.
Figure 30:
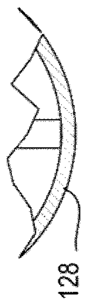
FIG. 30 is an enlarged view of a region 31 of FIG. 25 portion taken along line 30-30 of FIG. 25.
Figure 25:
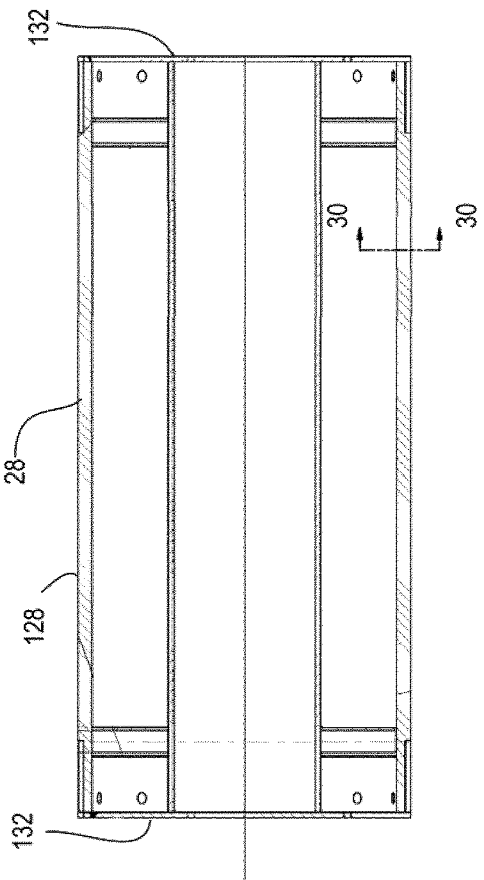
FIG. 25 is a cutaway view taken along line 25-25 of FIG. 24.
Figure 29:
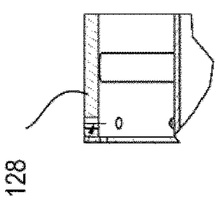
FIG. 29 is an enlarged view of a portion taken along line 29-29 of FIG. 24.
Figure 28:
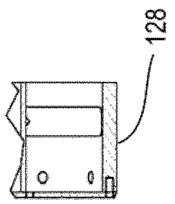
FIG. 28 is an enlarged view of a portion taken along line 28-28 of FIG. 24.
Figure 27:
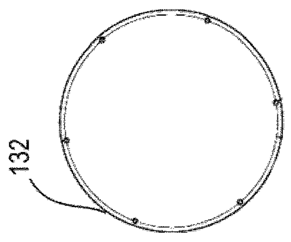
FIG. 27 shows a dust cover component attached to each end of the hammer component shown in FIG. 1.
Figure 24:
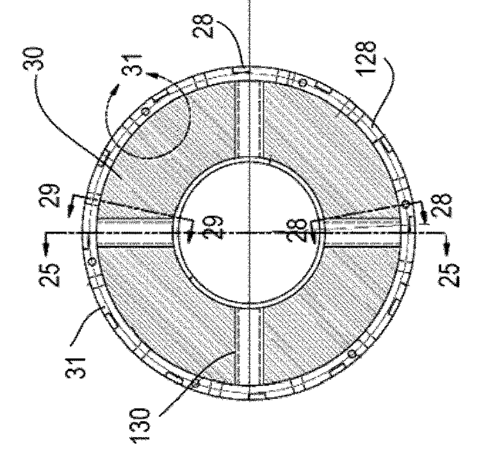
FIG. 24 is an end view of one example of a hammer component.
Figure 26:
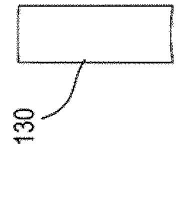
FIG. 26 is an enlarged view of a supporting pipe component shown in FIG. 24.

Combined with longitudinal 18 movement of the material 38, this rotation and passing of the material circumferentially around the hammer 28 may results in a helical transport 82 of the material (as shown in FIG. 18) down the anvil 22 to an ejection port 96. Commonly, the ejection port 96 is longitudinally in opposition to the chute 58.

During comminution, rock or other material to be comminuted is fed into the MRGM 20 from a chute 58 or by other means that guides the material 38 into the chamber 24. The material then passes between the anvil 22 and the hammer 28. Rotation of the anvil 22 conveys the material 38, by rotation and gravity to a comminution gap 49 between the anvil 22 and the hammer 28, and the hammer 28 applies pressure to the material 38. This action comminutes the material 38 within the anvil 22 by way of compressive fracturing of the material 38 (e.g. rock). In some embodiments, the feed chute 58 penetrates the anvil shield. In some embodiments, the anvil shield may be flat or conical and may be fitted with ridges and/or protrusions which may launch material 38 into the main body of the anvil shell, where the material 38 can then be captured within comminution gap 49 as the hammer 28 and anvil 22 rotate together.

In one example, the material 38 may then pass through a grate or opening or equivalent exit 96 out of the MRGM 20 to be used in other processes. In other example embodiments, the material 38 may be further comminuted by the rotating action of the anvil 22 and hammer 28 through multiple rotations of anvil 22. In in one example, a retaining shield 40 forms a ring attached to the anvil 22 with a radially inner edge 46. The retaining shield 40 in one example rotates with the anvil 22 and as the material 38 passes over the inner edge 46 of the shield 40, the material 38 exits the mill 20. This inner edge 46 may also be configured to maintain the hammer 28 within the anvil 22. The retaining shield 40 may be positioned on either or both longitudinal end(s) of the anvil 22. In some embodiments, retaining shield 40 includes ports and/or openings. In some embodiments, the ports and/or openings may be of varying sizes and/or have varying spacing from the edge of anvil 22, so as to allow comminuted material 38 to exit MRGM 20.

Figure 8:
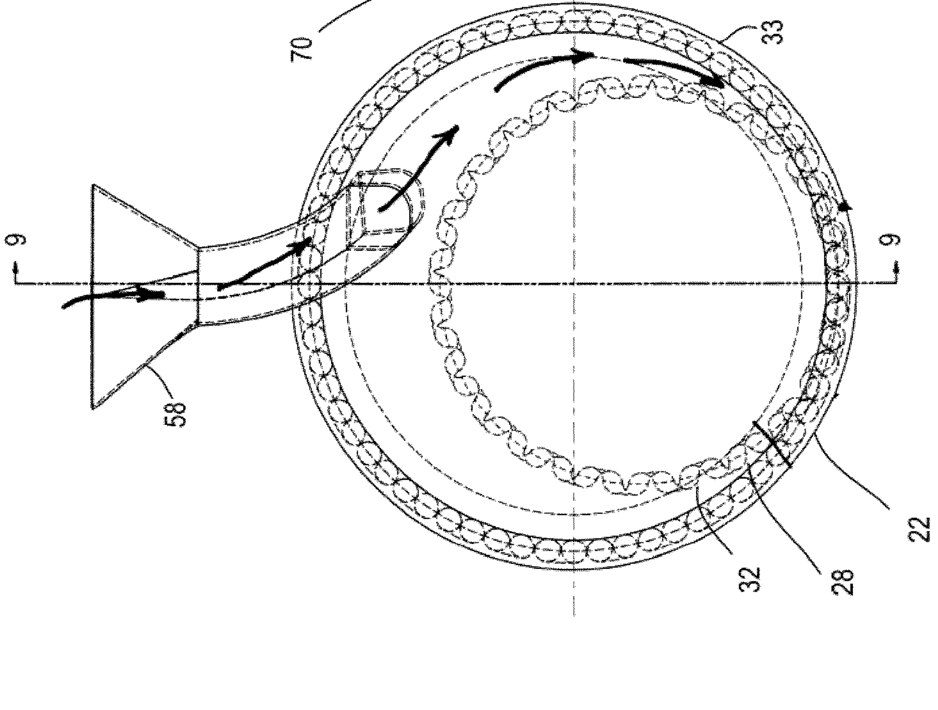
FIG. 8 is a highly schematic end view of another example of the MRGM.

In one example, the textured surfaces 62 of the anvil 22 and/or textured surfaces 63 of the hammer 28 (as shown by way of simplified example in FIG. 8) may assist in breaking the material 38. In one previously described example, the anvil 22 may be rotated by an external drive (motor 44) either near a central region (as shown in FIG. 2), adjacent the bearing pads 26 on the perimeter, or by other methods. The material 38 generally might not conform to the surfaces 62/63. As such, material 38, and in particular large particles of material 38, may commonly bridge from one texture ridge to another in a two, three, or more point contact compression. This bridging may result in in shear fracturing of the material 38 in addition to compression fractures due to the pressure of the hammer 28 pressing down on the material 38 against the anvil 22. As each protruding element 32 contacts the material 38, the material 38 will tend to fracture and break. In some embodiments, larger particles of material 38 may be broken in some segments of the textured ridge, and other sections may be configured to break unconfined, thinner particle beds of more uniform particle sizes.

Figure 3:
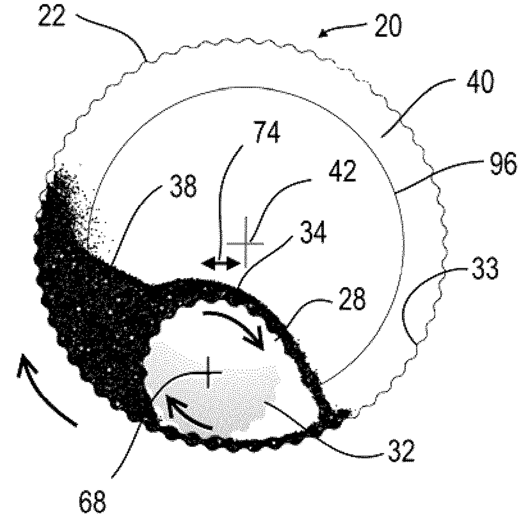
FIG. 3 is a cross sectional end view of one example of the MRGM in use.
Figure 4:
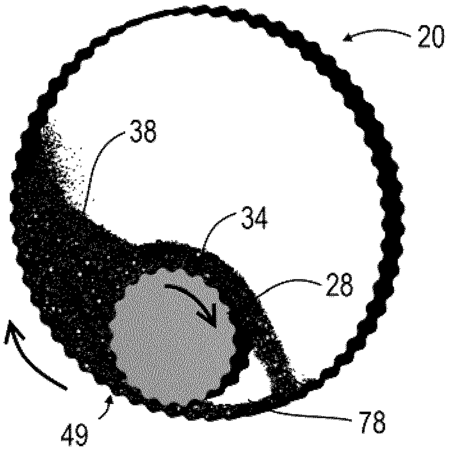
FIG. 4 is a cross sectional perspective end view of one example of the MRGM in use.

In one example as shown by way of example in FIG. 3, the radially outward surface 34 of the hammer 28 includes protruding elements 32. The inner surface 51 of the anvil 22 may be smooth or may include cooperating protruding elements 33 which cooperate with the protruding elements 32 during comminution.

Figure 9:
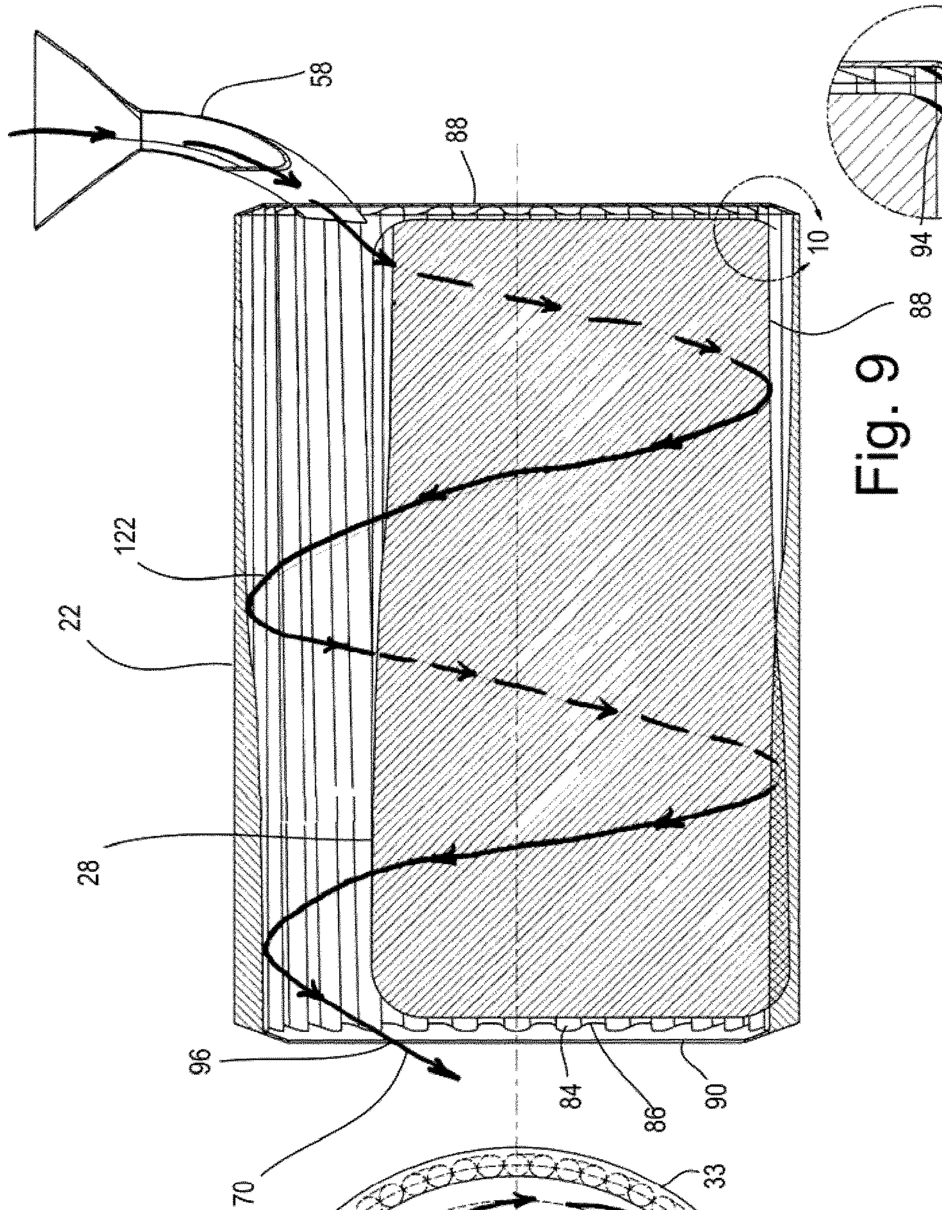
FIG. 9 is a cross-sectional view taken along line 9-9 of FIG. 8.
Figure 10:
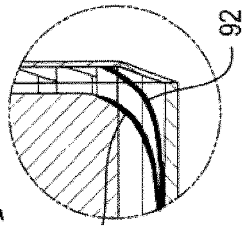
FIG. 10 is a detail view of the region 10 of FIG. 9.

During initial startup of the MRGM 20, an initial buildup of material 38 is anticipated at a feed end 88. This may result in tilting of the hammer 28 (as shown in FIG. 9), resulting in longitudinal movement of the hammer 28 relative to the anvil 22. In at least one example, this longitudinal movement may be unexpectedly toward the discharge end 90. Thus, a fillet 92 (rounded edge) may be formed on the inner longitudinal end(s) of the anvil 22 as well as a cooperating fillet 94 on the longitudinal end(s) of the hammer 28.

In one example, tilting may be temporary, and as the material 38 moves down the MRGM 20 towards the ejection port 96, the system may become longitudinally balanced. In other example embodiments, the MRGM is configured to maintain such a tilt, so as to improve efficient movement of material 38 from the chute 58 to the ejection port 96.

In some embodiments, hammer 28 is vertically positioned by gravity to achieve the desired gap 49 between anvil 22 and hammer 28. In some embodiments, hammer 28 may be segmented or divided into multiple portions or "slices" which are substantially perpendicular to the longitudinal axis of rotation (as depicted in FIGS. 49A and 49B). The slices may be of various lengths or size. Segments of the roll may be coupled to one or another, or to a central shaft, so as to ensure that torque transferred from the anvil 22 or other drive mechanism is transmitted to each segment, thereby ensuring rotation of each segment.

In some embodiments, roll segments may be filled with similar materials. In some embodiments, roll segments may be filled with different materials. Roll segments may include similar or distinct surface textures and profiles. Roll segments may be filled with similar or different materials to provide similar or variable forces for each segment. Roll segments may be configured to shift vertically and/or horizontally relative to adjacent segments so as to provide a sequence of minimum gap distances between hammer 28 and anvil 22.

In one example, material 38 is contained in the chamber 24 by a shield 40 on one or both longitudinal ends of the MRGM 20. In one example the feed chute 58 extend longitudinally inward of the shield 40 into chamber 24 to a discharge end 90. The shield(s) 40 may withhold the material from escaping the mill 20 at undesired positions during comminution.

In one example, once the material 38 is crushed and rotates past the position 76 of minimum gap 49 between the anvil 22 and the hammer 28 a desired number of times (as shown in FIG. 9), most of the material 38 will exit the mill 20. In these examples, retention of the partially comminuted material 38 will aid in crushing more of the remaining material 38, as depicted in FIGS. 3-7, where it can be seen that the material 38 tumbles, slides, and comminutes the other material 38 as contact is made between individual rocks of the material 38, contact with the anvil 22 and hammer 28, and in compression between the anvil 22 and the hammer 28. In these figures the shape and size of the comminuted material 38 may be affected by the hammer 28, and the hammer 28 may impart additional pressure in the compression fracture zone 78. This geometry (e.g. the shape and form of the rotating particles) may be referred to as a kidney 53 due to its shape.

Figure 5:
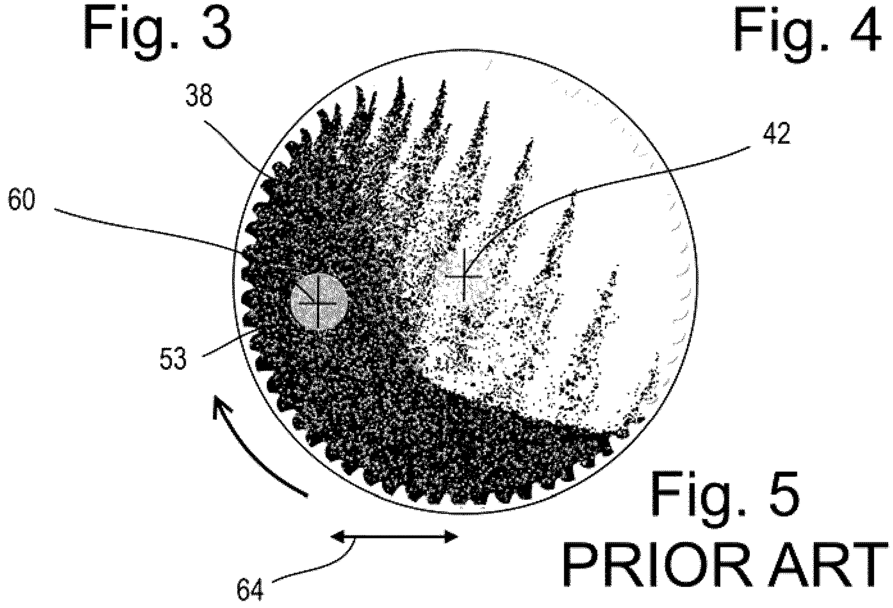
Fig. 5 PRIOR ART
FIG. 5 is a cross sectional end view of a prior art mill in use.
Figure 6:
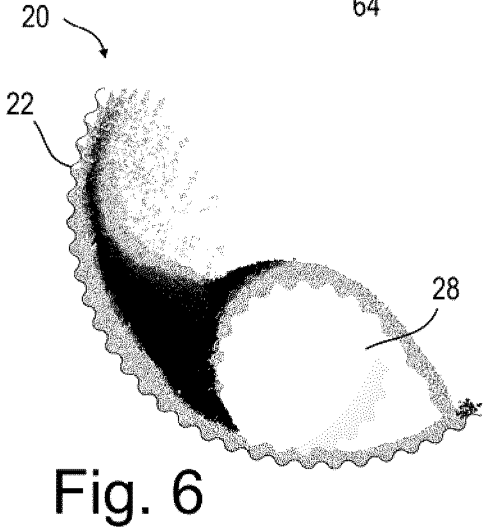
FIG. 6 is a cross sectional end view of the example of the MRGM shown in FIG. 12.

FIG. 5 shows a mill rotating at a relatively high rate of speed without a hammer 28, where the material 38 travels further circumferentially around the anvil 22 and drops vertically downward onto the kidney 53. Such a configuration does not provide efficient control of the compression fracture zone 78 (FIG. 4) and thus may be less efficient than an MRGM 20.

Additionally, some embodiments may allow material 38 to re-enter the compression fracture zone 78 (as shown in FIG. 9) to create a finer ground material and/or to increase efficiency. To this end, grates or classifiers may be utilized. For example, in one example embodiment, material 38 may be comminuted with longitudinally finer surface features between the anvil 22 and hammer 28 (axially from one side of the ring to the other side, parallel to the axis of rotation). In another example, material 38 may enter a first longitudinal end of the MRGM 20 and discharge out the opposing longitudinal end. For example, an embodiment may have multiple stages of course to fine grinding in the same mill 20, moving material dimensional geometries from large hammer, to fine mesh.

In one example, the hammer 28 may have a first diameter at a first (feed) end, and a second diameter at other longitudinal positions to control longitudinal 18 movement of material 38 along the mill 20. In one example, the hammer 28 may be tapered along the longitudinal length to accomplish the aforementioned longitudinal positioning. In addition, the protrusions on the hammer 28, and on the anvil may be configured to maximize the benefits of this geometry.

In one example, the core 30 of the hammer 28 (or individual segments thereof) may be made of a different material than the outer surface 31. For example, the core 30 may be made of lead, while the outer surface may be made of steel, which may maximize one or more of density, comminution efficiency, and life of the hammer 28.

Figure 7:
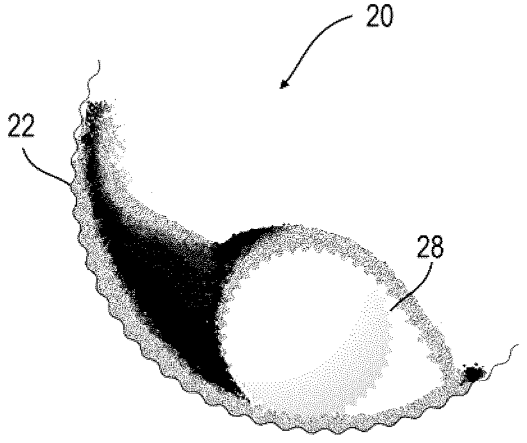
FIG. 7 is a cross sectional end view of the example of the MRGM shown in FIG. 12.

In one example, the ratio of the protrusions on the hammer 28 may be configured to maximize efficiency. In the example shown in FIG. 3, the relative size of the ramp-shaped protrusions 32/33 is equivalent on the hammer 28 and anvil 22 respectively, whereas the example shown in FIG. 7 shows arcuate protrusions 32/33 having different sizes. In one example, the number of protrusions 32 on the hammer 28 may be less than the number of protrusions on the anvil 22, which may result in the hammer 28 rotating at a faster angular velocity than the anvil 22. The example shown in FIG. 7 shows a greater number of smaller sized protrusions 32 on the hammer 28 than on the anvil 22, which may result in a varied angular velocity between the hammer 28 and the anvil 22. When the number of protrusions around the hammer 28 equals the number of protrusions on the anvil 22 and the protrusions substantially contact during rotation, the relative angular velocity will be substantially the same (i.e. they will rotate at substantially the same rotational speed).

In some embodiments, one or both of the anvil 22 and hammer 28 may have alternating ridges 84 and/or grooves 86 as shown in FIG. 9 to provide one or more of increasing surface contour, better gripping and retention of material 38 entering the compression zone 78, and directing material 38 down the longitudinal length of the MRGM 20 as desired. In this embodiment, the ridges 84 may also impart shear stresses in the material 38 due to differential speeds between anvil 22 and hammer 28.

During comminution, as the anvil 22 and hammer 28 rotate, the material 38 is compressed between the anvil 22 and hammer 28 as the gap 49 between the anvil 22 and hammer 28 decreases into the compression zone 78. As depicted in the embodiment of FIG. 2, material 38 that is smaller than the exit grates (openings) may pass out of the MRGM for classification or further processing. Non-ejected material 38 may remain in the MRGM 20 and return to the compression fracture zone 78 where it will be again comminuted and eventually be ejected. Ejection may occur past the shield 40.

In one embodiment as shown in FIG. 1, the shield 40 may include an open region such that the rock which does not pass through the openings 70 when provided, may be ejected through the ejection port 96 as shown in FIG. 9 along the direction of flow 70.

One significant disadvantage of conventional high pressure grinding roll (HPGR) and other crushing mills is that material tends to get jammed between the shield and one or both rollers. In many designs, the shield is static, and does not rotate with the anvil 22, further causing material to jam between the shield and the other components. Some embodiments may at least partially alleviate this issue by providing a shield 40 which may be attached to the anvil 22 either permanently or removably and rotates therewith. Thus, the shield(s) 40 will generally hold material 38 within the chamber 24, and any material that would lie against the shield 40 in the compression zone 78, will be compressed therein.

In some embodiments, MRGM 20 using a hammer with no external pressure device may substantially reduce capital cost, complexity and operating costs over existing mill designs. Further, the disclosed free-floating hammer in such an arrangement may also substantially reduce capital cost, complexity and operating costs. In addition, MGRM 20 may be used in existing ball and rod mills with relatively minor configuration changes and adaptations thereto.

One objective of some embodiments is to create a focused and efficient comminution zone to allow thin ore bed breakage for maximum efficiency without requiring external force augmentation.

Another objective of some embodiments is to improve the throughput of existing comminution mills of the same shell (anvil) size. In some embodiments, MRGM 20 may have as much as twice the throughput of a similarly-sized existing comminution mill.

Another objective of some embodiments is to achieve a reduced mill retention time relative to existing comminution mill technology.

Another objective of some embodiments is to provide a comminution mill which can accept larger ore particle sizes. In some embodiments, ore sizes may be upwards of 60 mm, which may represent a substantial increase relative to the existing 12 mm upper particle size for conventional ball mill technology at a moderate ore hardness of Axb=37.5.

Figure 32:
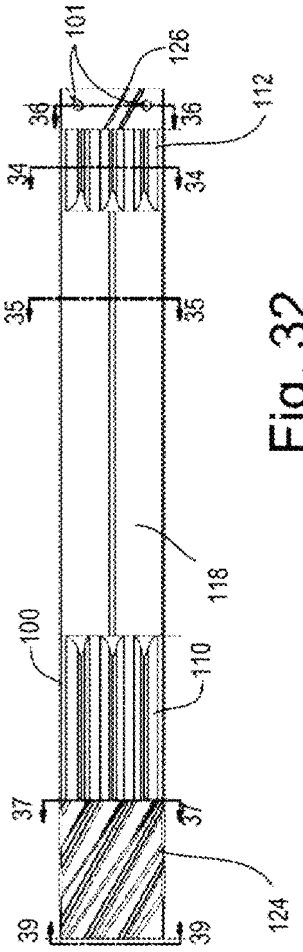
FIG. 32 is a top view of one example of an anvil liner component.
Figure 33:
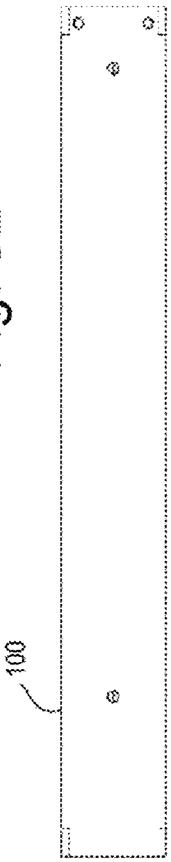
FIG. 33 is a bottom view of the component shown in FIG. 32.
Figure 36:
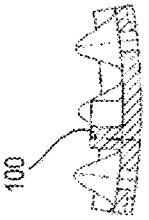
FIG. 36 is a cross sectional view taken along line 36-36 of FIG. 32.
Figure 35:
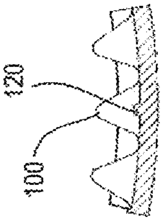
FIG. 35 is a cross sectional view taken along line 35-35 of FIG. 32.
Figure 34:
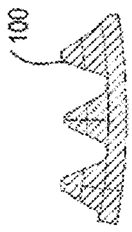
FIG. 34 is a cross sectional view taken along line 34-34 of FIG. 32.
Figure 44:
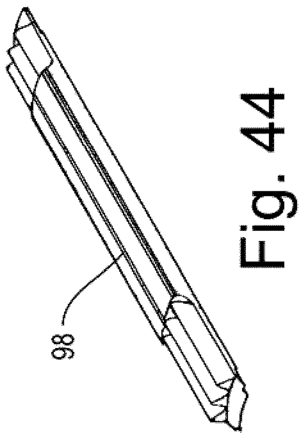
FIG. 44 is a perspective view of the example shown in FIG. 40.
Figure 40:
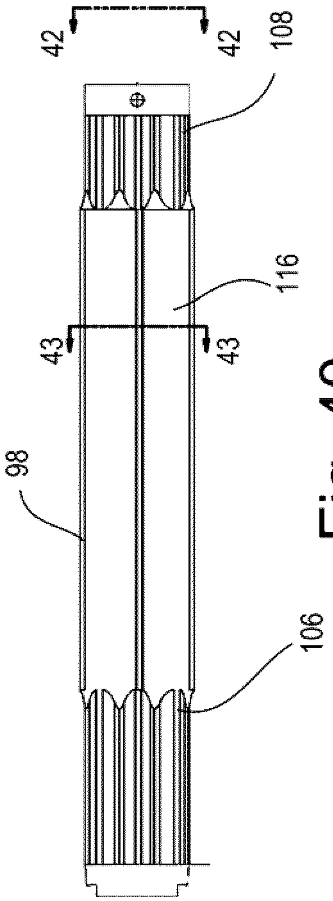
FIG. 40 is a top view of one example of a hammer panel component.
Figure 41:
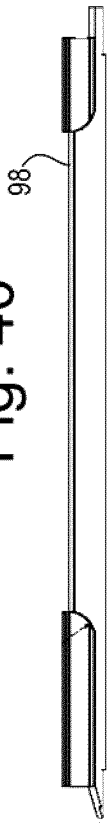
FIG. 41 is a side view of the hammer panel component shown in FIG. 40.
Figure 42:
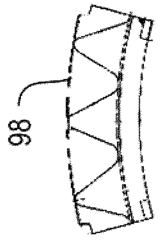
FIG. 42 is a n end view from line 42-42 of FIG. 40.
Figure 43:
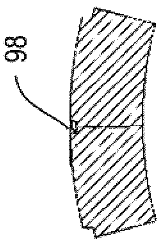
FIG. 43 is a cutaway view taken along line 43-43 of FIG. 40.
Figure 45:
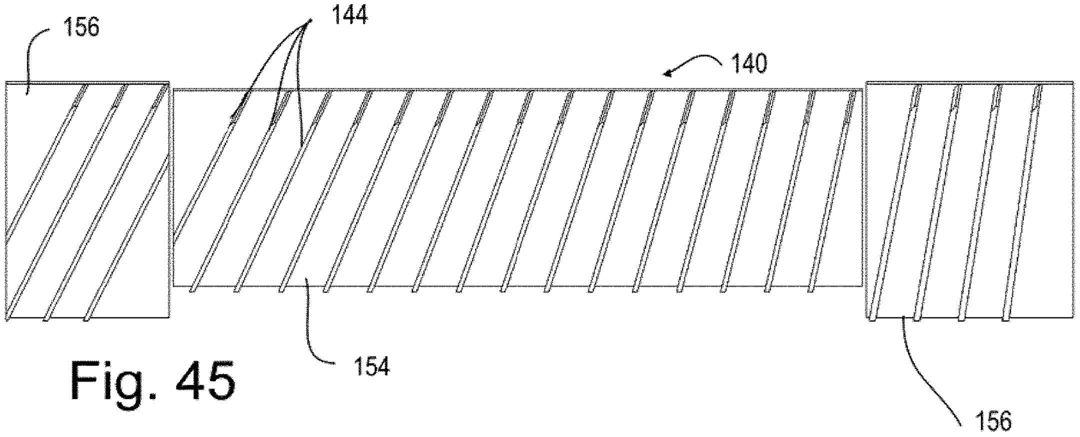
FIG. 45 is a top view of one example of a vane structure component.
Figure 46:
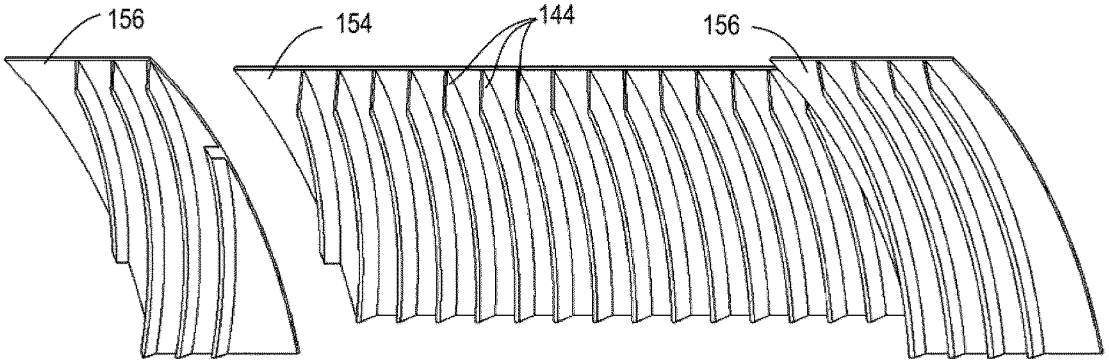
FIG. 46 is a perspective view of the vane structure component shown in FIG. 45.
Figure 47:
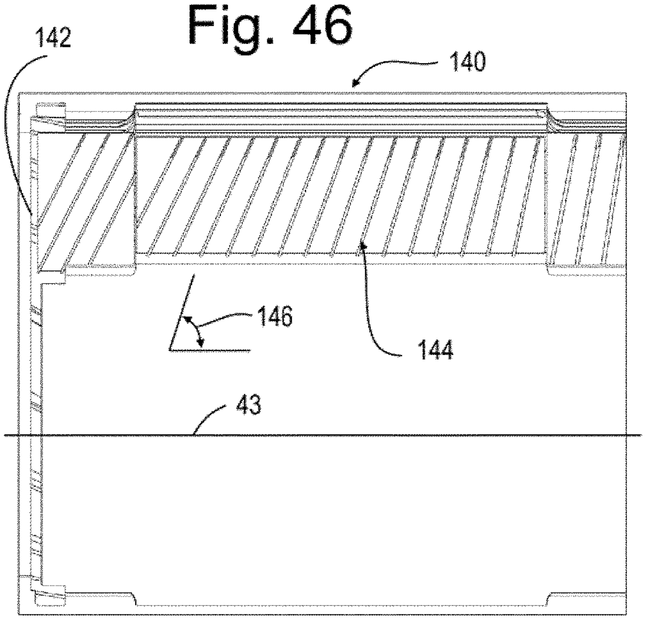
FIG. 47 is a front view of the vane structure component shown in FIG. 45.
Figure 48:
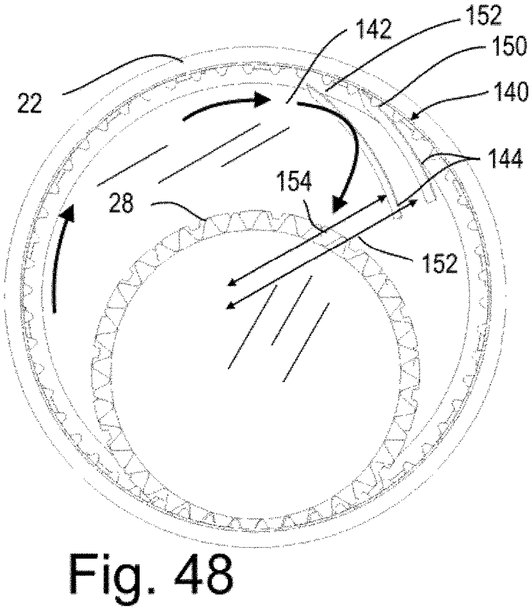
FIG. 48 is an end view of the vane structure component shown in FIG. 45 positioned within a MRGM.

Another objective of some embodiments is to provide mill wear liner replacement without removing hammer 28 from the anvil 22. This may be accomplished by providing the surface 34 of the hammer 28 with removable panels 100 (as shown in FIG. 32).

Another objective of some embodiments is to reduce grinding media and liner wear consumption compared with the ball or rod mill. In some embodiments, as much as an 80% reduction in wear may be achieved by using a single hammer 28 instead of multiple balls/rods which impact each other and wear each other during comminution.

Another objective of some embodiments is to improve grinding efficiency improvement compared with the existing ball mill technology. In some embodiments, efficiency may be more than doubled. The traditional metric for efficiency is kWh/ton (or "specific energy"—energy per ton of ore processed) to effect the same change in particle size distribution from feed to product size. Another metric is surface area liberation per ton of ore processed. In some embodiments, energy consumption relative to existing systems may be reduced by not having to rotate a "kidney" shaped mass as far from the center line of the mill (thereby requiring less torque for the same mass, as the moment arm is shorter).

Some embodiments provide guide vanes or ridges 84 to move material 38 longitudinally along the mill length from the feed end 88 to the discharge end 90. The vanes 84 may be configured to control the number of passes under the hammer roll from the feed end to the charge end, thereby enabling finer control of product fineness.

In some embodiments, material transport and dispersion may be greatly impacted by controlling the thickness of the bed of particles being broken, so as to maintain thinness (e.g. less than 5 particles deep) and "unconfined" conditions (e.g. void spaces remaining available around the material, so that it is not packed too tightly). Some embodiments of MRGM 20 may allow for the thickness of the bed of particles to be maintained within a desired range, and to avoid packing particles too tightly. For example, some existing designs may be thin and unconfined, but are nevertheless random and inefficient in terms of ensuring breakage, and other existing designs may be thick beds with confined particle beds Another objective of some embodiments is to provide material transport and localized dispersion within the mill. In some embodiments, transport and/or localized dispersion may be enhanced through the use of air knives, water injection, and the like. In some embodiments, MRGM 20 may be operated in a "wet mode" or a "dry mode". In a dry mode of operation, feed material is between 80% to 100% by mass of solids, and up to 20% liquid (whether water, other additives, or other liquids). In a wet mode of operation, the feed material may be a mixture of rock and water and/or other liquids containing 10% to 80% solids by mass.

In some embodiments, MRGM 20 may provide an improvement in capacity relative to existing ball mill designs of the same size.

The MRGM 20 disclosed herein is configured to internally distribute and crush material 38 (ore) between the hammer 28 and the anvil 22.

Some embodiments may improve throughput (in tons per hour) relative to existing ball mill designs.

Some embodiments may be configured to rotate at or above 80% of critical speed to ensure that material 38 that has passed beneath hammer 28 can be cascaded back up and over hammer 28 to be broken additional times. It will be appreciated that the actual speed may depend on the liner surface design and on the material being broken, as well as possible the presence and amount of water being added to MRGM 20. In some embodiments, rotation may occur at approximately 38 rpm within the 20-40 rpm range of an existing variable speed motor. In some embodiments, the actual rotational speed may be a function of the diameter of the shell of the MRGM 20.

As noted above, the presence of liquids mixed with feed material may affect the suitable range of rotational speeds for anvil 22. For example, in a wet mode, some embodiments of MRGM 20 may be capable of operating at any rotational speed while nevertheless maintaining sufficient centripetal or centrifugal force on material 38 so as to ensure particles remain "pinned" to the anvil during a rotation (thereby ensuring particles may be subjected to successive comminution cycles). In some embodiments, MRGM 20 may operate at between 60%-100% of the critical speed when in a dry mode. In some embodiments, liner geometry and/or vanes and other features of the inner anvil surface and outer hammer surface may contribute to guiding feed materials up and over the hammer roll. In some embodiments, this may allow for rotation of anvil 22 at below critical speeds (which may reduce energy consumption).

Some embodiments may be configured to operate using a 30 hp motor, and may have a power demand of 18 hp at 2 tph, which may represent an improvement in power consumption relative to existing comminution mill designs.

In some embodiments, MRGM 20 may be configured to facilitate the replacement of worn or damaged hammer panels 98 and/or anvil panels 100. In one example, as shown, these panels 98/100 may be removed and replaced as needed due to wear, changes in material being comminuted, changes in panel design, etc. In some embodiments, the panels 98 and/or 100 may be replaced without removing the hammer 28 from the anvil 22.

In some embodiments, MRGM 20 may improve energy efficiency relative to existing ball mills as measured by power draw at a specified throughput and size reduction or energy consumption as a function of particle surface area.

One significant advantage of some embodiments is that an existing ball mill in service may be retrofitted to an MRGM 20 as disclosed herein by, for example, removing the balls and inserting a roller hammer 28. In some embodiments, shields 40 of an existing ball mill may be modified and/or replaced to conform to new design parameters. Anvil panels 100 may be installed into existing ball mills and optionally later removed to revert the mill to a functioning ball mill, if desired. In a shell supported ball mill, shell supports may be upgraded so as to support the additional mass of hammer 28. In a trunnion supported mill, a discharge shield may require modification (see FIG. 49B) to continue to support the shell while allowing for material to exit the mill without overflowing at the trunnion. In both cases, modification of the collection system for particles exiting the mill may be necessary.

FIG. 11 shows an operating ball mill, without ore and slurry, having a high ball charge at 75% critical speed. The drive torque is dependent on indicated moment arm 64 at a given rotational speed (RPM). FIG. 11 shows the center-of-mass 60 to the left of the clockwise rotating mill centerline 42. This indicates, in relative terms, the amount of motor torque required to maintain the ball charge position at the drive RPM. FIG. 12 shows a roller hammer 28 position within the same ball mill shell/anvil 22, with no ore at the same mill speed. FIG. 12 also depicts the runner hammer 28 center-of-mass 68 is very near the ball mill centerline 42. Therefore, the arrangement in FIG. 12 has a much smaller moment arm 74 than the equivalent moment 64 of the ball mill shown in FIG. 11. As ore is loaded into MRGM 20, center-of-mass 68 will shift marginally to the left, but will nevertheless result in much shorter moment arm relative to the moment arm 64 shown in FIG. 11.

Beyond the moment arm advantage, some embodiments of MRGM may have additional benefits. For example, MRGM 20 may exert much greater pressure on the material 38 than prior known mills. In some embodiments, MGRM 20 may have about 50% more total crushing mass than a ball mill, on a much smaller point rock breakage zone.

Figure 13:
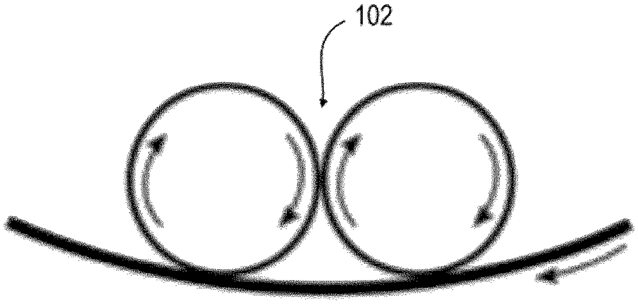
Fig. 13 PRIOR ART
FIG. 13 is a highly schematic detail view of a ball mill/rod mill showing directions of rotation and high friction contact points between components.

Some embodiments of MRGM 20 may substantially eliminate all ball mill ball-to-ball shear losses that are present between every two balls in contact 102 of FIG. 13 within a ball mill 104 as shown schematically in FIG. 13. MRGM 20 may reduce ball consumption present in prior art ball mills 104. This ball consumption may represent a significant operating cost associated with ball mills. Similarly, in a rod mill, all rod-to-rod contacts and other unproductive energy consuming actions may be significantly reduced or eliminated.

In some embodiments, when operated in dry mode, MRGM 20 may reduce iron hydroxide contamination on sulfide mineral surfaces. In some embodiments, this may yield an increase in sulfide mineral recovery in downstream flotation by up to 2%.

Figure 14:
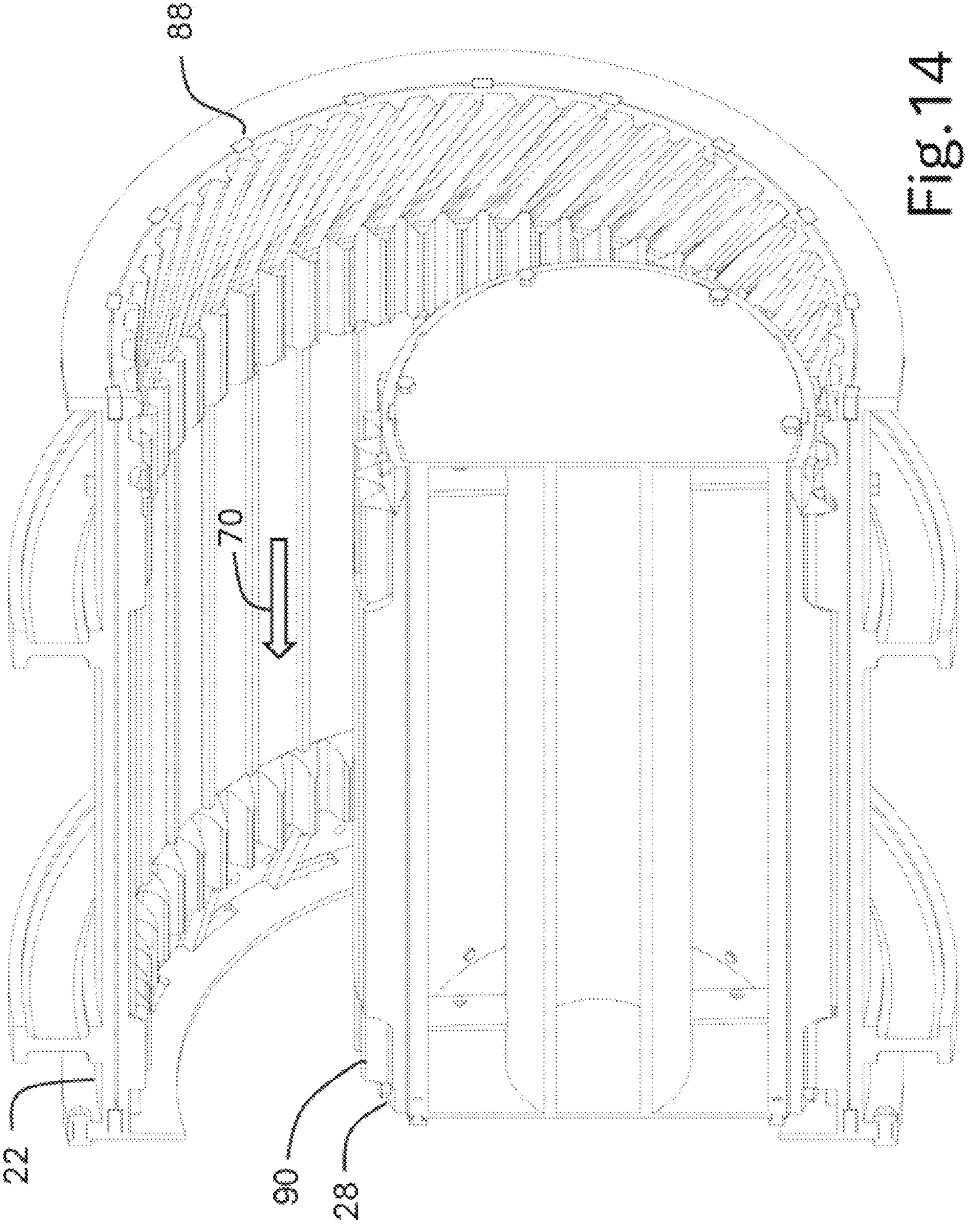
FIG. 14 is a perspective cutaway view of an example of an MRGM as disclosed herein.

In some embodiments, MRGM 20 comprises a hammer roller 28 surface geometry which includes radially extending gear teeth 106/108 along some or all of the hammer length. Gear teeth 106/108 may include the ridges 84 described herein. In some embodiments, gear teeth 106/108 may include separate gear teeth 106 near the feed end 88 of the roller 28 and/or gear teeth 108 on the discharge end 90. In some embodiments, teeth 106/108 may be configured to mesh with corresponding mating radially extending teeth 110/112 and/or other surface features designed on the anvil's inner surface 51. In some embodiments, MRGM 20 comprises two main structural components as shown in cutaway schematics in FIGS. 14 and 15, namely the anvil 22 assembly and the hammer 28 assembly. As depicted in the example embodiment of FIG. 15, MRGM 20 may include anvil 22, feed end flange 40A, discharge plate 40B, and riding tires 114 with liners or anvil panels 100 are installed on the inner surface 51 of the mill shell or anvil 22.

In some embodiments, hammer 28 may include hammer panels 98 installed on the outer surface 34 of the hammer 28. In some embodiments, hammer panels 98 are configured to mate with anvil panels 100.

In some embodiments, components 100 comprise the shell liner. In some embodiments, the shell liner geometry may have multiple axial geometry variant zones. In one example there may be 18 pieces that constitute the anvil panels 100. It will be appreciated that embodiments in which the shell liner comprises more than 18 pieces or fewer than 18 pieces are contemplated. In some embodiments, individual liner pieces can be removed from MRGM 20. In one example this can be accomplished via pulling recesses 101 at the discharge end 90.

Figure 16:
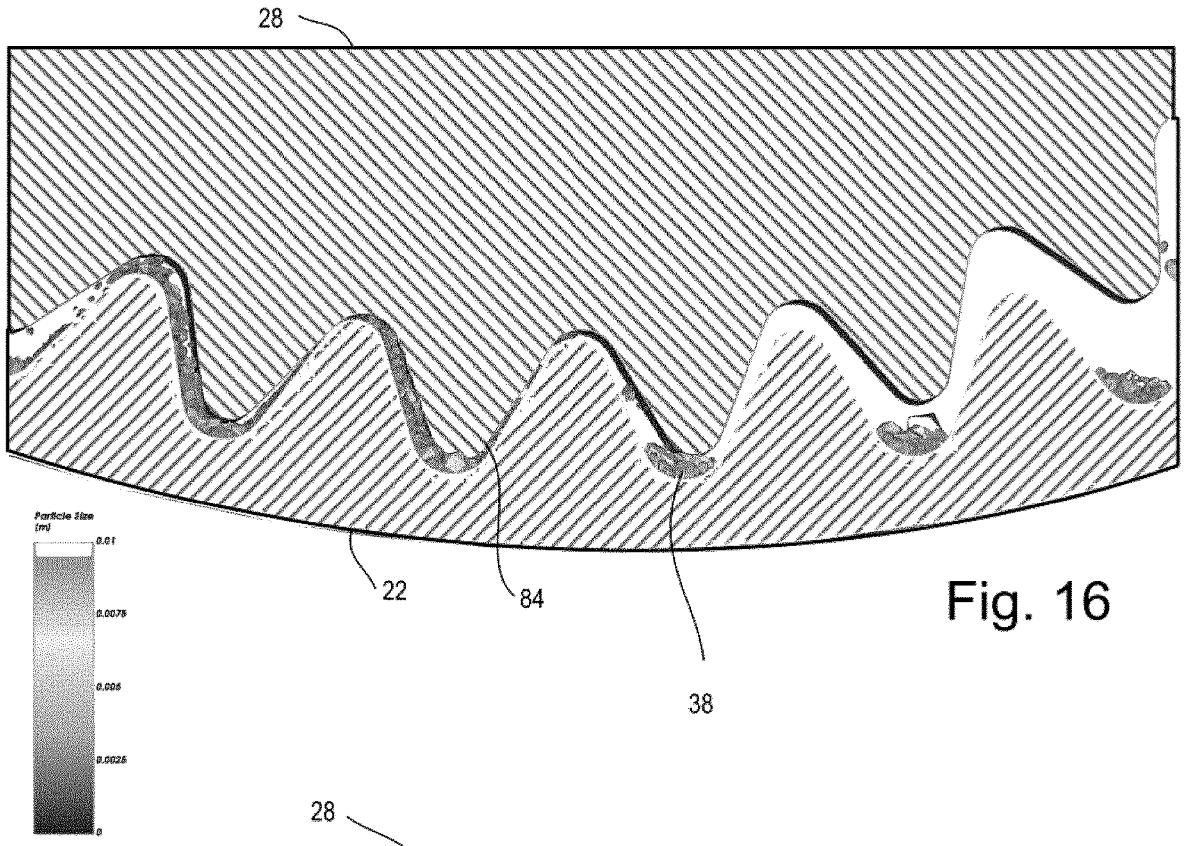
FIG. 16 is a highly schematic end view of one example of an MRGM as disclosed herein with cooperating ridges on the anvil and on the hammer.
Figure 17:
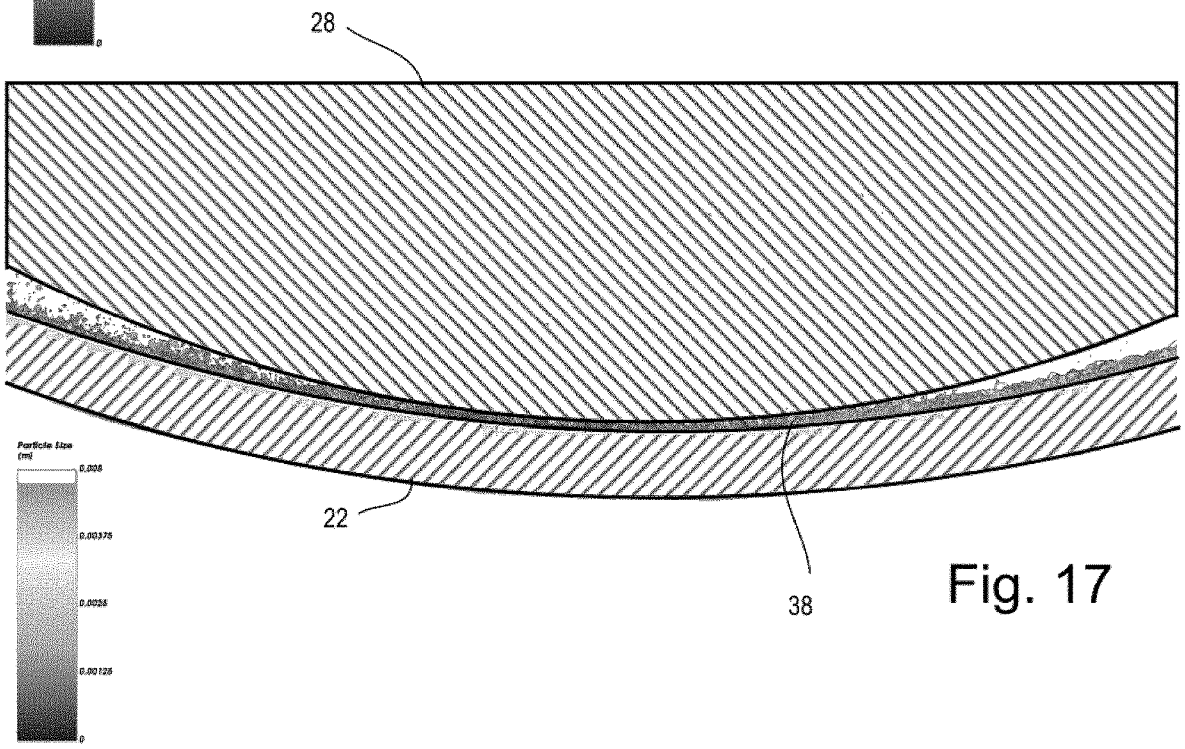
FIG. 17 is a highly schematic end view of one example of an MRGM as disclosed herein with smooth contact surfaces on the anvil and on the hammer.
Figure 19:
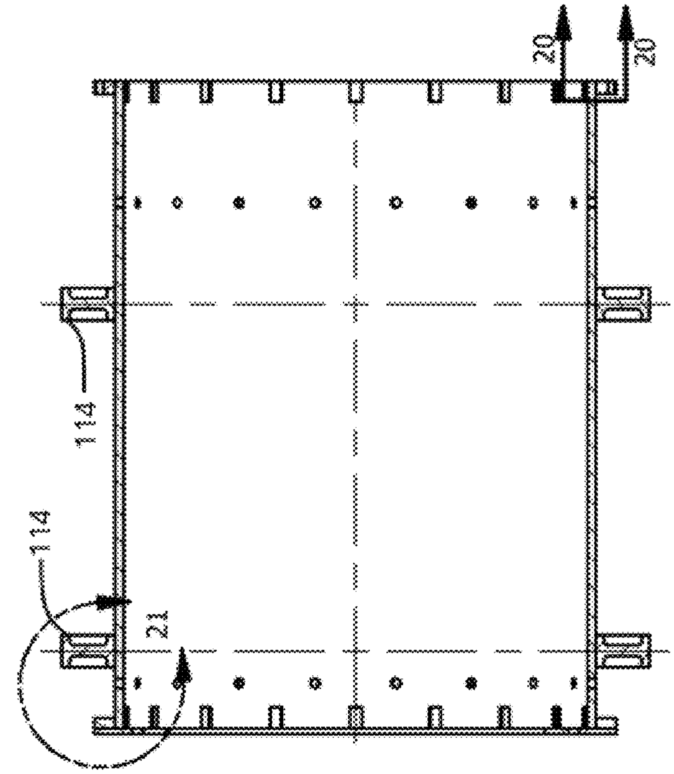
FIG. 19 is a side cutaway view of the anvil component shown in FIG. 18.
Figure 23:
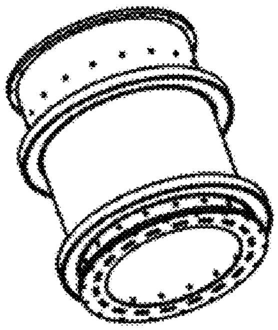
FIG. 23 is a perspective view of the MRGM anvil shown in FIG. 18.
Figure 22:
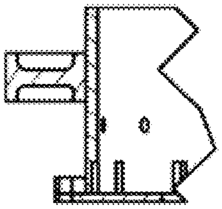
FIG. 22 is a partial cutaway view taken along line 22-22 of FIG. 18.
Figure 21:
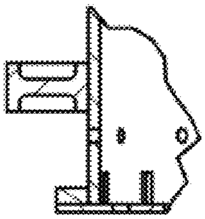
FIG. 21 is an enlarged view of the region 21 of FIG. 19.

FIGS. 16 and 17 illustrate example embodiments of crushing and grinding zones within MRGM 20. In some embodiments, MRGM 20 uses a high mass hammer 28 to achieve the necessary downward force. This may be advantageous in that the mass of the hammer 28 provides downward force, rather than more complex configurations in which an external pressure-applying means (e.g. a hydraulic ram) contributes to downward force.

As previously mentioned, the material 38 might not conform to the surfaces 62/63. As such, material 38 may bridge from one texture ridge to another in a two, three, or more point contact compression in regions using ridges 84 (as shown in FIG. 16). This bridging may result in shear fracturing of material 38 in addition to compressive fracturing due to the pressure of the hammer 28 pressing down on the material 38 against the anvil 22. As each protruding element 32 contacts the material 38, the material 38 will tend to fracture and break. When anvil 22 and/or hammer 28 comprise smooth surfaces as shown in FIG. 17, the resultant comminution of material 38 may be much finer. Thus, in some embodiments, it may be desirable to provide regions of ridges 84 and smooth regions (as depicted in FIG. 15), so as to address both coarse and fine particle breakage.

Figure 15:
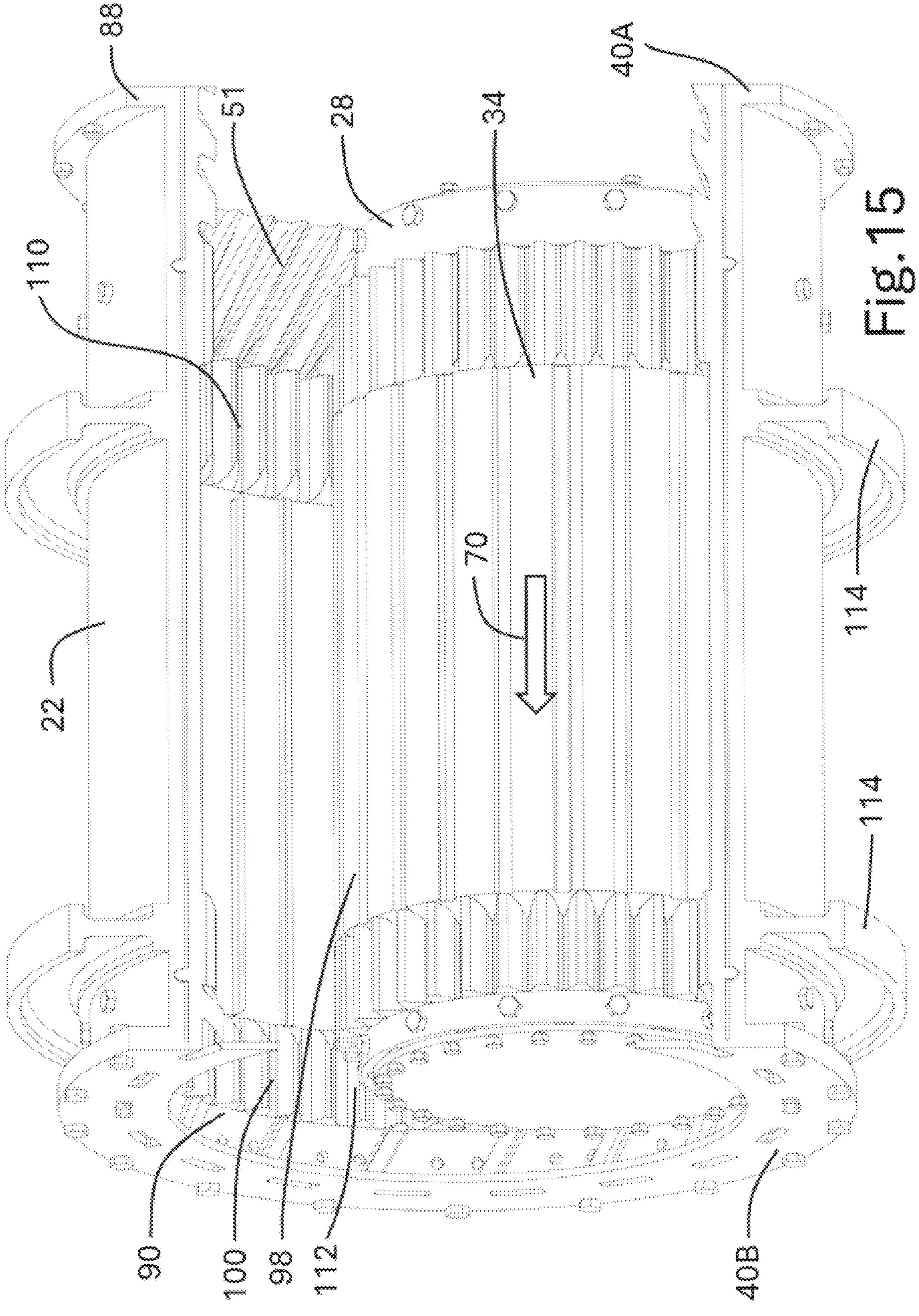
FIG. 15 is a perspective cutaway view of an example of an MRGM as disclosed herein.

In the example embodiment shown in FIG. 15, and also as depicted in FIGS. 24-37, gear teeth 106/108 may be separated by a substantially smooth surface 116. Smooth surface 116 may be radially adjacent to a similar substantially smooth surface 118 on the anvil panel 100. In some embodiments, surface 118 may be complementary in shape to surface 116. In some embodiments, surface 118 may be longitudinally positioned between gear teeth 110/112.

Figure 38:
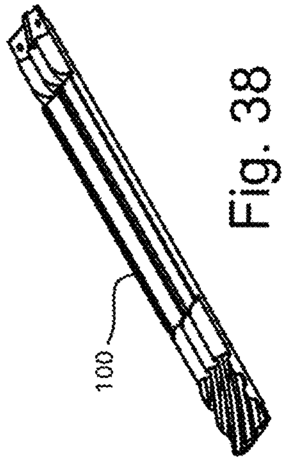
FIG. 38 is a perspective view of the anvil liner component shown in FIG. 32.
Figure 39:
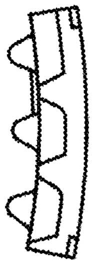
FIG. 39 is an end view taken along line 39-39 of FIG. 32.
Figure 37:
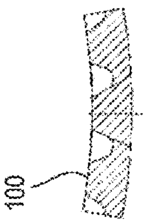
FIG. 37 is a cross sectional view taken along line 37-37 of FIG. 32.

The substantially smooth surfaces 116 and/or 118 in one example may comprise elevated lands 120 (as depicted, for example, in FIGS. 32, 35 and 38) configured to promote radial/helical flow of material 38 as shown in FIG. 9.

In some embodiments, to further increase the longitudinal movement vector of the material 38 along a helical flow 122, anvil 22 and/or hammer 28 may comprise radially extending feed vanes 124 (see FIG. 32) on the feed end of the anvil 22 and/or hammer 28. These feed vanes 124 may be non-parallel to the axis 43 of the hammer 28 and arranged helically to drive the material 38 toward the comminution region or compression fracture zone 78.

In addition to the axial movement encouraged by the structures/textures in some example embodiments of hammer 28 and anvil 22 described herein, a vane structure 140 may also be utilized. Vane structure 140 may be mounted within anvil 22 and remain stationary therein as anvil 22 rotates during operation. For example, vane structure 140 may be cantilevered from an end panel 142. In some embodiments, end panel 142 may be one or more shield(s) 40 previously described. In other embodiments, vane structure may be attached to end panel 142 or to a similar structure. In some embodiments, vane structure 140 may alternatively be suspended from end panels 142 on both longitudinal 18 ends of MRGM 20. In some embodiments, one or more vanes 144 may be suspended in the space above hammer 28 and below the upper inner surface of the anvil 22. Vanes 144 may be oriented at a vane angle 146 to the axis 42 of anvil 22 and the axis 43 of hammer 28. In some embodiments, vanes 144 may be a section of a helix. Vane angle 146 may be selected to promote the axial (longitudinal 18) flow of material 38 down the axial length of anvil 22. In some embodiments, vane angle 146 may vary from the feed end 88 to the discharge end 90, such that material 38 is advanced further down anvil 22 with each rotation. In some embodiments, each vane 144 may eject particles from MRGM 20 through discharge end 90. Once ejected, ejected particles may be captured in an enclosure external to anvil 22.

In some embodiments, vanes 144 are attached to a vane panel 148 which provides support and rigidity for vanes 144.

In some embodiments, vane panel 148 and attached vanes 144 may have various distinct sections corresponding to regions of anvil 22. For example, in a section 150 of the vane structure 140 above a first section (e.g. smooth section 118) of hammer 28, vane panel 148 may have a first radius 152. In another section or sections 156 of the vane structure 140 above or adjacent to a second section, such as gear teeth 110/112 and/or discharge vanes 126, vane panel 148 may have a second radius 154.

To further increase the longitudinal movement vector of the material 38 past the discharge end 90, anvil 22 and/or hammer 28 may comprise radially extending discharge vanes 126 on the discharge end 90 of the anvil 22 and/or hammer 28. These feed vanes 124 may be non-parallel to the axis 43 of the hammer 28 and arranged helically to drive the material 38 out of the comminution region or compression fracture zone 78.

In some embodiments, hammer 28 comprises an outer shell 128 filled or partially filled by a material 30 as previously described. To support such a structure, reinforcing tubes 130 or equivalents may be used. In addition, dust shields 132 may be used to keep material 38 and other dirt, debris, or the like, out of hammer 28.

In addition to circuit configurations such as open circuit (single pass flow through) and closed circuit (in which a portion of discharge is screened and recycled for combining with fresh feed material at the input of MRGM 20), some embodiments of MRGM 20 may be operated in a cascading mode.

In the cascading mode, some or all of the discharge material may be returned to the feed end of the MRGM 20 (or to a second MRGM 20) without being combined with any additional fresh feed material. The ability to provide multiple passes through MRGM 20 may allow for the minimum gap between hammer 28 and anvil 22 to decrease (sometimes significantly) with each successive pass through, as the largest particle size in each feed stream will diminish. In some embodiments, cascading mode may ensure that material is well distributed based on particle size in order to maintain bed thinness and unconfined breakage (which, as noted above, may provide improvements to the energy efficiency of the comminution process).

FIGS. 49A and 49B are illustrations of an example embodiment of a hammer having multiple axial sections 28*a*, 28*b*, 28*c*. As depicted, each of axial sections 28*a*, 28*b*, 28*c* extend along the axial direction of the hammer axis. In some embodiments, different sections (e.g. sections 28*a*, 28*b*) may have different radii, thereby resulting in a variable gap distance in the longitudinal direction between inner surface of anvil 22 and the outer surfaces of sections 28*a*, 28*b*, 28*c*. In the example embodiments depicted in FIGS. 49A and 49B, it can be seen that the gap distance from right to left decreases. Therefore, in embodiments in which feed material is guided along a helical path and through multiple cycles, the feed material may be comminuted to progressively smaller particle sizes. For example, feed material comminuted by section 28*a* may be comminuted to a first particle size, and then be comminuted by section 28*b*, which will result in a second particle size smaller than the first particle size, and then be comminuted by section 28*c*, resulting in an even smaller particle size. It will be appreciated that although FIGS. 49A and 49B depict an embodiment with 3 hammer sections, embodiments in which more than 3 or less than 3 hammer sections are contemplated.

In some embodiments, different sections 28*a*, 28*b* may have different outer surface geometries. For example, vanes on section 28*a* may be in a different pattern than vanes on section 28*b*. Many other variations in design for different sections 28*a*, 28*b* are contemplated as described herein with reference to other embodiments (e.g. other embodiments described above in relation to a hammer which is not segmented into sections, including the use of liner panels which may be removable).

In some embodiments, sections 28*a*, 28*b*, 28*c* may be driven by a central shaft 4900 (as depicted in FIG. 49B). That is, when one section 28*a* is caused to rotate, the other sections 28*b* and 28*c* may in turn also be caused to rotate, as torque may be distributed by shaft 4900. In some embodiments, sections 28*a*, 28*b*, 28*c* may be driven through protrusions (e.g. ridges, or the like) on inner surface of anvil 22 engaging or mating with protrusions on outer surfaces of various sections 28*a*, 28*b*, 28*c*. In some embodiments, shaft 4900 may be driven by external means (such as, for example, a motor). In some embodiments, sections 28*a*, 28*b*, 28*c* may use an Oldham coupling or equivalent between sections (as depicted by an X between sections in FIG. 49A).

In some embodiments, different axial sections 28*a*, 28*b*, 28*c* may be partially or fully filled (denoted by regions 4910) with solids and/or water to vary the weight and density of different sections 28*a*, 28*b*, 28*c*. In some embodiments, portions of sections 28*a*, 28*b*, 28*c* may be filled with elastomers or fluids. It will be appreciated that varying the weight and density of hammer 28 may obviate the need for any external pressure system to apply downward pressure to hammer 28 during operation. For example, in some embodiments, the gravitational force added by introducing weight It will be appreciated that FIGS. 49A and 49B depict example embodiments of trunnion supported mills, in which the shields on the ends are conical rather than flat. In some embodiments, conical or other non-flat feed chute arrangements may be required.

LABEL LISTING

20—MRGM
22—anvil
23—shaft
24—chamber
26—bearing pad
28, 28*a*, 28*b*, 28*c*—hammer and axial sections of hammer
30—core of hammer
31—shell of hammer
32—protruding element
33—protruding element
34—outer surface of hammer
36—gap (FIG. 2)
38—material
40—shield
42—axis of anvil
43—center/axis of 28
44—motor
46—inner edge of shield
48—chute inset
49—gap
50—inner diameter of anvil
51—inner surface of anvil 52—outer diameter of hammer
53—kidney
54—clearance
56—feeding point of chute 58
58—chute
60—center of mass
62—surface of anvil
64—lateral distance
66—outer surface
68—center of mass
70—openings in grate
74—distance or moment
76—position in FIG. 1
78—fracture zone
82—helical transport
84—ridges
86—grooves
88—feed end location
90—discharge end
92—fillet
94—fillet
96—ejection port
98—hammer panel
100—anvil panel
101—Pulling recesses
102—Ball contact
104—Ball mil
106—Feed end gear teeth on roller 28
108—Discharge end gear teeth on roller 28
110—Feed end gear teeth on anvil 22
112—Discharge end gear teeth on anvil 22
114—Riding tires
116—Smooth surface on hammer panel
118—Smooth surface on anvil panel
120—Elevated lands
122—Helical flow
124—Feed vanes
126—Discharge vanes
128—Outer shell of 28
130—reinforcing tubes.
132—Dust shield
140—vane structure
142—end panel
144—vanes
146—vane angle
148—vane panel
150 region of vanes with hammer
152—first radius
154—second radius
156—second region of vanes While the present disclosure is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those skilled in the art. The disclosed apparatus and method in their broader aspects are therefore not limited to the specific details, representative apparatus and methods, and illustrative examples shown and described. Accordingly, departures may be made from such details without departing from the spirit or scope of applicants' general concept.

Therefore I claim:

1. An apparatus for comminuting a material, the apparatus comprising:

an anvil comprising a chamber and an inner surface, said inner surface having one or more anvil panels, each of said one or more anvil panels containing a plurality of anvil protrusions, said anvil configured to rotate about an anvil axis; and a hammer positioned within said chamber, said hammer including an outer surface, said outer surface having one or more hammer panels, each of said one or more anvil panels containing a plurality of hammer protrusions configured to engage with said plurality of anvil protrusions, said outer surface and said inner surface separated by a gap distance to define a comminution zone, and said hammer configured to rotate about a hammer axis parallel to said anvil axis and radially offset from said anvil axis;

wherein said apparatus is configured to receive said material in said chamber, and wherein said anvil and said hammer are configured to comminute said material as said material travels through said comminution zone.

2. The apparatus of claim 1, wherein at least some of said material that has travelled through said comminution zone is returned to said comminution zone without introducing additional feed material to said chamber.

3. The apparatus of claim 1, wherein said hammer is substantially cylindrical, and said hammer comprises a plurality of axial sections arranged along said hammer axis.

4. The apparatus of claim 3, wherein at least one of said plurality of axial sections has a first radius and at least one of said plurality of axial sections has a second radius different from said first radius.

5. The apparatus of claim 4, wherein said gap distance includes a plurality of gap distances, each of said plurality of gap distances corresponding to a distance between an outer surface of a respective axial section of said plurality of axial sections and said inner surface of said chamber.

6. The apparatus of claim 3, wherein at least a first of said plurality of axial sections has a first outer surface geometry and at least a second of said plurality of axial sections has a second outer surface geometry different from said first outer surface geometry.

7. The apparatus of claim 3, wherein said plurality of axial sections are driven by a central shaft.

8. The apparatus of claim 3, wherein said plurality of axial sections are at least partially filled with solids and/or fluids.

9. The apparatus of claim 1, further comprising a chute for feeding said material into said chamber, wherein said chute includes one or more liners, each of said one or more liners having ridges and/or flutes configured to guide said material.

10. The apparatus of claim 1, wherein said material comprises a mixture of solid material to be comminuted and liquid.

11. The apparatus of claim 1, wherein said anvil is configured to rotate at a speed of rotation that causes comminuted material to return to said comminution zone.

12. The apparatus of claim 1, wherein said one or more hammer panels are removable.

13. The apparatus of claim 1, wherein said one or more anvil panels are removable.

14. The apparatus of claim 1, wherein rotation of said hammer is driven at least in part by one or more of said plurality of anvil protrusions engaging with one or more of said plurality of hammer protrusions.

15. The apparatus of claim 1, wherein at least one of said hammer and said anvil has radially extending feed vanes arranged helically to drive said material towards said comminution zone.

16. A method of comminuting a material, the method comprising:

transporting said material to a chamber of an anvil, said chamber including an inner surface, said inner surface having one or more anvil panels, each of said one or more anvil panels containing a plurality of anvil protrusions;

rotating said anvil about an anvil axis;

rotating a hammer positioned within said chamber about a hammer axis parallel to said anvil axis and axially spaced apart from said anvil axis, said hammer comprising an outer surface, said outer surface having one or more hammer panels, each of said one or more hammer panels containing a plurality of hammer protrusions configured to engage with said plurality of anvil protrusions, wherein said outer surface and said inner surface are separated by a gap distance to define a comminution zone;

comminuting said material as said material travels through said comminution zone.

17. The method of claim 16, further comprising returning at least some of said material that has passed through said comminution zone to said comminution zone without introducing additional feed material to said chamber.

18. The method of claim 16, further comprising segmenting said hammer into a plurality of axial sections arranged along said hammer axis.

19. The method of claim 18, wherein at least one of said plurality of axial sections has a first radius and at least one of said plurality of axial sections has a second radius different from said first radius.

20. The method of claim 18, wherein at least one of said plurality of axial sections has a first outer surface geometry and at least one of said plurality of axial sections has a second outer surface geometry different from said first outer surface geometry.

21. The method of claim 16, further comprising guiding said material through said chamber via one or more liners, said one or more liners having ridges and/or flutes.

22. The method of claim 16, comprising rotating said anvil at a speed of rotation that causes comminuted material to return to said comminution zone.

23. The method of claim 16, wherein said one or more anvil panels are removable.

24. The method of claim 16, wherein said one or more hammer panels are removable.

25. The method of claim 16, further comprising:

transporting said comminuted material to a second chamber of a second anvil, said second chamber including a second inner surface, said second inner surface having a plurality of second anvil protrusions;

rotating said second anvil about a second anvil axis;

rotating a second hammer positioned within said second chamber about a second hammer axis parallel to said second anvil axis and axially spaced apart from said second anvil axis, said second hammer including a second outer surface, said second outer surface having a plurality of second hammer protrusions configured to engage with said plurality of second anvil protrusions, wherein said second outer surface and said second inner surface are separated by a gap distance to define a second comminution zone; and further comminuting said comminuted material as said material travels through said second comminution zone.

* * * * *